United States Patent
Caron

(10) Patent No.: US 10,308,167 B2
(45) Date of Patent: Jun. 4, 2019

(54) CONTROL OF DISPLAY FOR VEHICLE WINDOW

(71) Applicant: Magna Closures Inc., Newmarket (CA)

(72) Inventor: Stephen James Caron, Aurora (CA)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 15/027,980

(22) PCT Filed: Oct. 9, 2014

(86) PCT No.: PCT/CA2014/050979
§ 371 (c)(1),
(2) Date: Apr. 7, 2016

(87) PCT Pub. No.: WO2015/051461
PCT Pub. Date: Apr. 16, 2015

(65) Prior Publication Data
US 2016/0236612 A1    Aug. 18, 2016

Related U.S. Application Data

(60) Provisional application No. 61/970,351, filed on Mar. 25, 2014, provisional application No. 61/888,751, filed on Oct. 9, 2013.

(51) Int. Cl.
*B60Q 1/26* (2006.01)
*G06Q 30/02* (2012.01)
(Continued)

(52) U.S. Cl.
CPC ............. *B60Q 1/268* (2013.01); *B60K 35/00* (2013.01); *B60K 37/06* (2013.01); *B60Q 1/38* (2013.01);
(Continued)

(58) Field of Classification Search
CPC .................................................. G06F 19/3406
(Continued)

(56) References Cited

U.S. PATENT DOCUMENTS 6,820,897 B2 * 11/2004 Breed ................... B60R 21/015
280/735
6,986,581 B2 * 1/2006 Sun ........................ G03B 21/60
353/31
(Continued)

FOREIGN PATENT DOCUMENTS

GB        2505756        3/2014

OTHER PUBLICATIONS

Basics of Capacitive Sensing and Applications, David Wang, 2014.*

*Primary Examiner* — Javid A Amini
(74) *Attorney, Agent, or Firm* — Ridout & Maybee LLP

(57) ABSTRACT

A vehicle defining an opening with a closure panel adapted to cover the opening generally includes a window in the closure panel. Furthermore, a rear window defrosting wire is often mounted to the window. A user interface system is disclosed to include a capacitive switch wire having a portion mounted to the window proximate to, and overlapping with, the rear window defrosting wire, and a capacitive switch control unit connected to the capacitive switch wire and adapted to interpret a change a capacitance near the terminus of the capacitive switch wire as a command request. The system includes a projector and a controller adapted to control the projector to project an image onto the window proximate to the terminus of the capacitive switch wire, receive an indication of receipt of the command request and transmit a command to cause a state change in an element of the vehicle.

26 Claims, 18 Drawing Sheets

(51) Int. Cl.
*G06F 3/0484* (2013.01)
*G06F 3/01* (2006.01)
*B60Q 1/50* (2006.01)
*G06F 3/0481* (2013.01)
*G09F 21/04* (2006.01)
*G09F 27/00* (2006.01)
*G09F 19/18* (2006.01)
*B60K 35/00* (2006.01)
*B60Q 1/38* (2006.01)
*B60K 37/06* (2006.01)
*G06F 3/044* (2006.01)

(52) U.S. Cl.
CPC .............. *B60Q 1/503* (2013.01); *G06F 3/013* (2013.01); *G06F 3/0481* (2013.01); *G06F 3/04842* (2013.01); *G06Q 30/02* (2013.01); *G06Q 30/0265* (2013.01); *G09F 19/18* (2013.01); *G09F 21/04* (2013.01); *G09F 27/005* (2013.01); *B60K 2350/1012* (2013.01); *B60K 2350/2052* (2013.01); *B60K 2350/924* (2013.01); *G06F 3/044* (2013.01)

(58) Field of Classification Search
USPC ........................................................ 345/619
See application file for complete search history.

(56) References Cited

U.S. PATENT DOCUMENTS

| | | | | | |
|---|---|---|---|---|---|
| 8,606,430 | B2* | 12/2013 | Seder | .................... | B60Q 1/268 340/425.5 |
| 9,579,060 | B1* | 2/2017 | Lisy | .................... | A61B 5/6803 |
| 2004/0080256 | A1* | 4/2004 | Hampden-Smith | ...... | B01J 2/003 313/467 |
| 2004/0193413 | A1* | 9/2004 | Wilson | .................... | G06F 3/017 704/243 |
| 2004/0260470 | A1* | 12/2004 | Rast | ........................ | G06Q 10/06 701/300 |
| 2005/0174635 | A1* | 8/2005 | Bruegl | ................... | G02B 27/01 359/443 |
| 2005/0183303 | A1* | 8/2005 | Simonsen | ............... | G09F 13/08 40/560 |
| 2005/0242327 | A1* | 11/2005 | Ramachandran | .. | C09K 11/7734 252/301.4 R |
| 2006/0145825 | A1* | 7/2006 | McCall | ............... | B60R 25/2045 340/426.35 |
| 2006/0238385 | A1* | 10/2006 | Steenwyk | ............ | B60N 2/0228 341/33 |
| 2006/0262549 | A1* | 11/2006 | Schmidt | ............... | G07C 9/0069 362/459 |
| 2007/0276550 | A1* | 11/2007 | Desai | ............... | B60R 25/23 701/1 |
| 2008/0004769 | A1* | 1/2008 | Lenneman | ............. | B60K 37/06 701/36 |
| 2008/0030499 | A1* | 2/2008 | Wanda | .................... | G06F 3/011 345/419 |
| 2008/0302014 | A1* | 12/2008 | Szczerba | ................ | B60K 35/00 49/31 |
| 2009/0217211 | A1* | 8/2009 | Hildreth | .................. | G06F 3/017 715/863 |
| 2009/0268946 | A1* | 10/2009 | Zhang | ................ | G06K 9/00791 382/104 |
| 2010/0188226 | A1* | 7/2010 | Seder | ............... | G08B 21/0275 340/572.1 |
| 2010/0253594 | A1* | 10/2010 | Szczerba | ............... | G01S 13/723 345/7 |
| 2010/0253599 | A1* | 10/2010 | Szczerba | ............... | G01S 13/723 345/7 |
| 2010/0254019 | A1* | 10/2010 | Cui | ........................ | G01S 13/723 359/633 |
| 2010/0292886 | A1* | 11/2010 | Szczerba | ............... | G01C 21/365 701/31.4 |
| 2012/0089273 | A1* | 4/2012 | Seder | ..................... | B60Q 1/268 701/2 |
| 2012/0093357 | A1* | 4/2012 | Seder | .................. | B60W 30/095 382/103 |
| 2012/0113223 | A1* | 5/2012 | Hilliges | ..................... | G06F 3/00 348/46 |
| 2012/0169513 | A1* | 7/2012 | Szczerba | ................. | G02B 27/01 340/905 |
| 2012/0173069 | A1* | 7/2012 | Tsimhoni | ............... | G01C 21/365 701/25 |
| 2012/0188633 | A1* | 7/2012 | Akselrod | ................. | G02B 5/28 359/346 |
| 2012/0204133 | A1* | 8/2012 | Guendelman | ........... | G06F 3/017 715/863 |
| 2013/0006957 | A1* | 1/2013 | Huang | ..................... | G06F 3/017 707/706 |
| 2013/0021491 | A1* | 1/2013 | Lee | ........................ | H04N 19/56 348/222.1 |
| 2013/0076787 | A1* | 3/2013 | Mathieu | .................... | B60R 1/00 345/633 |
| 2013/0142385 | A1* | 6/2013 | Mathieu | ............... | G01C 21/365 382/103 |
| 2013/0144521 | A1* | 6/2013 | Mathieu | ............... | G01C 21/365 701/410 |
| 2013/0147840 | A1* | 6/2013 | Seder | ..................... | G06T 3/005 345/633 |
| 2013/0342913 | A1* | 12/2013 | Tsimhoni | ............... | G02B 27/01 359/630 |
| 2014/0184644 | A1* | 7/2014 | Sharma | .................... | G06F 3/017 345/633 |
| 2014/0201689 | A1* | 7/2014 | Bedikian | ................. | G06F 3/011 715/863 |
| 2015/0227210 | A1* | 8/2015 | Chen | ....................... | G06F 3/016 345/156 |
| 2015/0321606 | A1* | 11/2015 | Vartanian | ........... | G02B 27/0101 348/148 |
| 2016/0001781 | A1* | 1/2016 | Fung | ..................... | B60W 40/08 701/36 |
| 2016/0062121 | A1* | 3/2016 | Border | ............... | G02B 27/0172 359/630 |
| 2017/0068119 | A1* | 3/2017 | Antaki | .................. | H04N 5/2251 |
| 2017/0168566 | A1* | 6/2017 | Osterhout | ............... | G06F 3/012 |

* cited by examiner

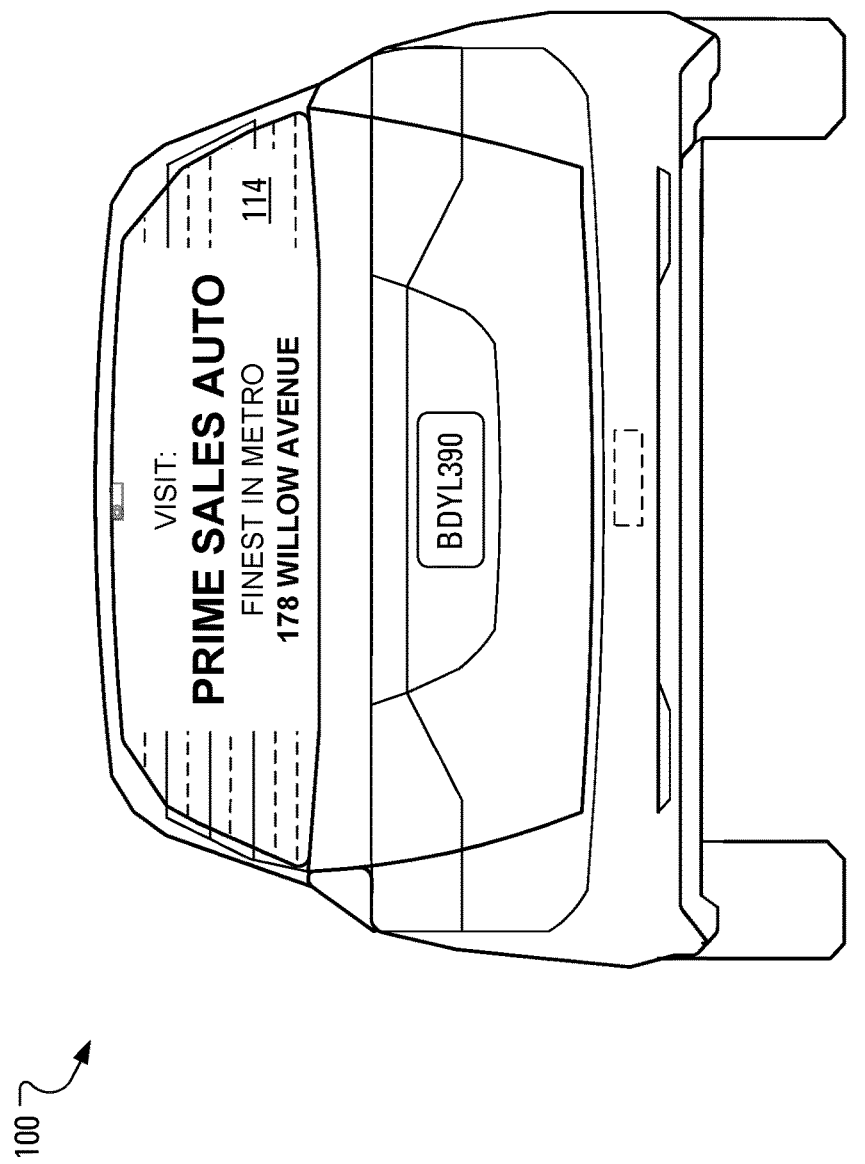

US 10,308,167 B2

CONTROL OF DISPLAY FOR VEHICLE WINDOW

CROSS-REFERENCE TO RELATED APPLICATIONS

This U.S. National Stage Patent Application claims the benefit of International Application Serial No. PCT/CA2014/050979 filed Oct. 9, 2014, entitled "CONTROL OF DISPLAY FOR VEHICLE WINDOW", which claims priority to U.S. Provisional Patent Application No. 61/888,751 filed Oct. 9, 2013 and U.S. Provisional Patent Application No. 61/970,351 filed Mar. 25, 2014, the contents of which are hereby incorporated herein by reference.

FIELD

The present application relates generally to automotive user interfaces and, more specifically, to control of a display for a vehicle window.

BACKGROUND

In motor vehicles, such as minivans, sport utility vehicles and the like, it has become common practice to provide the vehicle body with a large rear opening. A liftgate (also referred to as a tailgate) is typically mounted to the vehicle body or chassis with hinges for pivotal movement about a transversely extending axis between an open position, which allows access to the rear opening, and a closed position, which denies access to the rear opening. Typically, the liftgate may be operated manually or with a power drive mechanism including a reversible electric motor.

BRIEF DESCRIPTION OF THE DRAWINGS

Reference will now be made, by way of example, to the accompanying drawings which show example implementations; and in which:

FIG. 18 illustrates, for a vehicle with a window, a particular instance of a display triggered by the sensors of FIG. 13.

DETAILED DESCRIPTION

Figure 1:
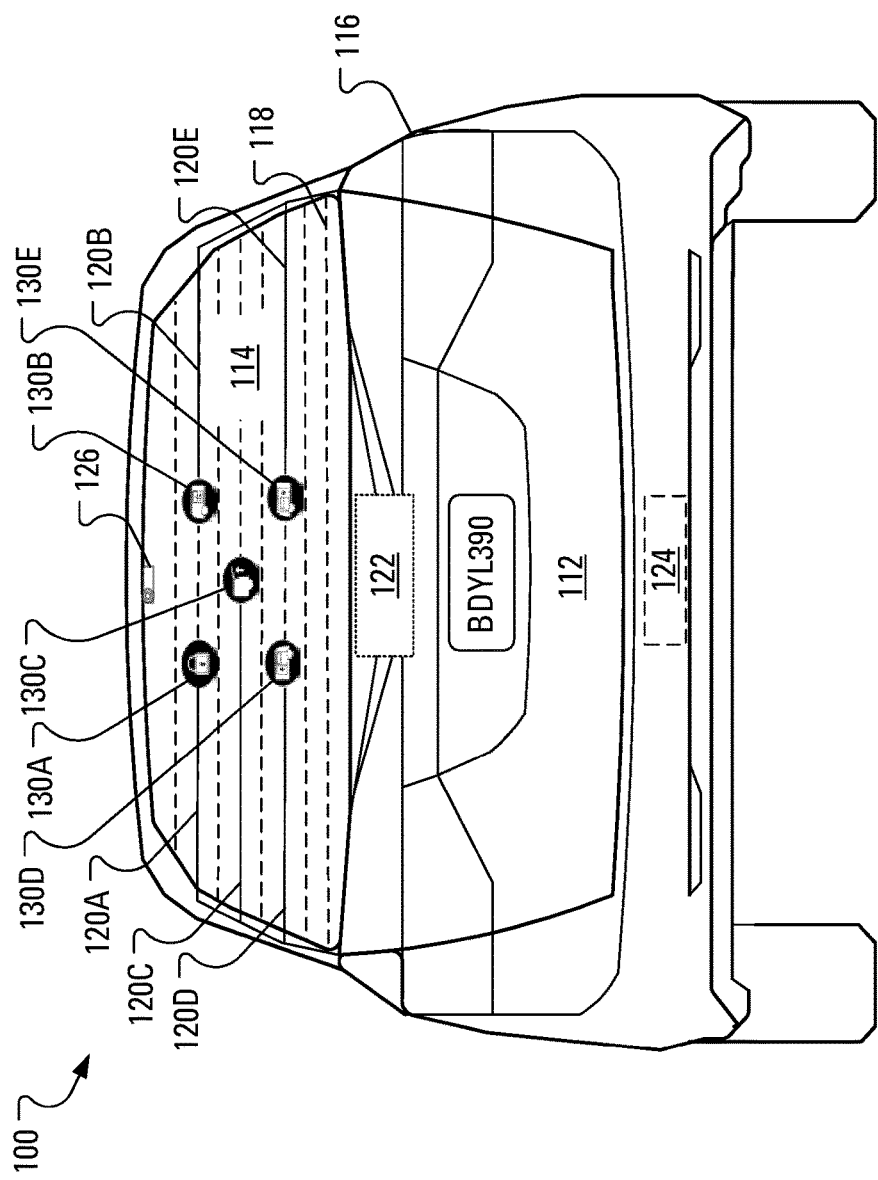
FIG. 1 illustrates, in rear view, a vehicle with a user interface including images projected, by a Digital Light Processing projector, onto a window that includes a plurality of capacitive switch wires in accordance with an embodiment of an aspect of the present disclosure.

In the following description, details are set forth to provide an understanding of the disclosure. In some instances, certain circuits, structures and techniques have not been described or shown in detail in order not to obscure the disclosure.

Upon approaching a vehicle, a user of the vehicle may wish to change the state of an element of the vehicle. That is, the user may want to open the liftgate to load cargo. The user may also want to unlock all doors so that a number of passengers may board the vehicle.

Rather than fiddle in a pocket for a key fob on which some buttons may exist for effecting the mentioned state changes, or others, it is proposed herein that the vehicle present the user with a user interface. By interacting with the user interface, the user may successfully cause the desired state changes to occur.

According to an aspect of the present disclosure, there is provided a display, access and information system. The display, access and information system including an image display mechanism adapted to cause images to appear externally on an otherwise transparent portion of a closure for an opening in a body of a vehicle, a sensor and a display, access and information module. The sensor may be adapted to detect a change in state of an element of the vehicle and transmit an indication of the change in state. The display, access and information module may be adapted to receive the indication of the change in state, interpret the indication of the change in state to determine an instruction and transmit the instruction to the image display mechanism.

According to an aspect of the present disclosure, there is provided a user interface system. The system includes a capacitive switch wire having a portion mounted to a window proximate to, and overlapping with, a rear window defrosting wire, the portion ending at a terminus, a capacitive switch control unit connected to the capacitive switch wire and adapted to interpret a change a capacitance near the terminus of the capacitive switch wire as a command request and a controller. The controller includes a processor adapted to receive, from the capacitive switch control unit, an indication of receipt of the command request and, responsive to the receiving the indication, transmit a command to cause a state change in an element of a vehicle.

According to a further aspect of the present disclosure, there is provided a method of operating a user interface. The method includes receiving, from a control unit, an indication of receipt of a command request, the control unit interpreting a change a capacitance near the terminus of the capacitive switch wire as the command request and, responsive to the receiving the indication, transmitting a command to cause a state change in an element of a vehicle.

According to a still further aspect of the present disclosure, there is provided a vehicle defining an opening. The vehicle includes a closure panel adapted to cover the opening, the closure panel including a window, a rear window defrosting wire mounted to the window and a capacitive switch wire having a portion mounted to the window proximate to, and overlapping with, the rear window defrosting wire, the portion ending at a terminus. The vehicle also includes a capacitive switch control unit connected to the capacitive switch wire and adapted to interpret a change a capacitance near the terminus of the capacitive switch wire as a command request and a controller including a processor adapted to receive, from the capacitive switch control unit, an indication of receipt of the command request and, responsive to the receiving the indication, transmit a command to cause a state change in an element of the vehicle.

According to an even further aspect of the present disclosure, there is provided a user interface system. The system includes a user interface control module, an image display mechanism adapted to cause a plurality of images to appear on an otherwise transparent portion of a closure for an opening in a body of a vehicle and a sensor adapted to: detect selection of a particular image among the plurality of images; and transmit, to the user interface control module, an indication of the selection of the particular image.

According to a still further aspect of the present disclosure, there is provided a user interface system. The system includes an image display mechanism adapted to cause images to appear on an otherwise transparent portion of a closure for an opening in a body of a vehicle a sensor and a user interface control module. The sensor is adapted to detect a change in state of an element of the vehicle and transmit an indication of the change in state. The user interface control module is adapted to receive the indication of the change in state, select, based on the change in state, a particular image and control the image display mechanism to display the particular image.

Other aspects and features of the present disclosure will become apparent to those of ordinary skill in the art upon review of the following description of specific implementations of the disclosure in conjunction with the accompanying figures.

Modern vehicles include a wide variety of electronically controlled devices. Accordingly, many such vehicles include a central "body control module" to maintain a state of the devices and, responsive to user control, change the state of, or activate/deactivate such devices. Example devices include those that assist in gaining ingress to, or egress from, the vehicle, such as power door locks, power sliding doors on a minivan and a power liftgate on vehicles so-equipped. Other devices may control opening and closing of power windows and/or a power sunroof. Other devices may assist in customizing a vehicle to a driver or passenger, such as controllers for memory power seats, controllers for power mirrors and controllers for seat heating and cooling. Other devices may assist in customizing a vehicle to a driver or passenger in terms of entertainment (e.g., music and video, either pre-recorded or broadcast) or vehicle interior climate control. Furthermore, the body control module may allow for remote starting of the vehicle.

Modern vehicles may incorporate an authorization system for allowing or denying entry into a vehicle and/or allowing or denying a driver the ability to start the motor of the vehicle. Manufacturers use keyless authorization systems under different names. For example, the keyless authorization system used by General Motors of is called a passive entry passive start ("PEPS") system. Alternative authorization systems may be known as a Remote Keyless Entry ("RKE") system or a Passive Keyless Entry ("PKE") system.

A vehicle equipped with an authentication system may include a rear end antenna. An electronic transceiver, often in the form of a key fob, is located with the user. The authentication system may receive signals from the fob through the rear antenna. Responsive to such receiving, the authentication system may initiate an operation such as, for example, controlling a liftgate to open or close, etc.

In general, PEPS and PKE systems does not require the user to push a button on the fob to initiate an operation. In contrast, an RKE system usually does require the user to push a button on the fob to initiate an operation.

In overview, as a user approaches the rear of a vehicle implementing aspects of the present disclosure, the PKE fob is sensed and a user interface is activated. Responsive to such activation, images are projected on the window of the liftgate. The images may be an assembly of unique targets, where each target is representative of a particular operation. A user interacts with the user interface by selecting a target, thereby causing an operation associated with the target to be initiated.

FIG. 1 illustrates, in rear view, a vehicle 100 illustrating a user interface in accordance with an embodiment of an aspect of the present disclosure. The user interface is illustrated, in FIG. 1, as being operatively associated with a closure panel 112 of a motor vehicle 100. According to one example embodiment, the closure panel is a liftgate 112. It will be understood by those skilled in the art that the user interface may be used with other closure panels and windows of a vehicle or of another device.

The liftgate 112 is mounted to a body 116 of the vehicle 100 through a pair of hinges (not shown) to pivot about a transversely extending pivot axis with respect to a large opening in the rear of the body 116. The liftgate 112 is mounted to articulate about the pivot axis between a closed position, where the liftgate 112 denies access to the opening, and an open position, where the liftgate 112 allows for free access to the opening and, consequently, the interior of the vehicle 100. In the open position, the liftgate 112 assumes a slightly upwardly angled position above horizontal. The liftgate 112 may be secured in its closed position by a latching mechanism or latch (not shown). The latch must be released or unlocked for the liftgate 112 to open. The liftgate 112 is opened and closed by a drive mechanism (not shown) with the optional assist of a pair of gas springs (not shown) connected between the liftgate 112 and the body 116. The drive mechanism may be similar to the drive mechanism described in PCT International Patent Application No. PCT/CA2012/000870, filed Sep. 20, 2012, the entire content of which is hereby incorporated herein by reference. The drive mechanism may be, or include, a powered strut as described in U.S. Pat. No. 7,938,473, issued May 20, 2011, also hereby incorporated herein by reference.

The liftgate 112 includes a window 114. The window 114 includes, mounted to an interior surface thereof, a plurality (eight are illustrated in FIG. 1) of rear window defrosting wires, an example one of which is illustrated in FIG. 1 as a dashed line associated with reference numeral 118.

The window 114 also includes a plurality of capacitive switch wires interlaced proximate to, and overlapping with, some of the rear window defrosting wires 118. Five example capacitive switch wires are illustrated in FIG. 1 associated with reference numerals 120A, 120B, 120C 120D and 120E. Individually or collectively, the capacitive switch wires may simply be referred to using reference number 120.

Conveniently, by arranging the capacitive switch wires 120 such that a portion of the capacitive switch wire 120 has an overlapping relationship with the rear window defrosting wires 118, the driver of the vehicle 100 is not inconvenienced by a visual distraction made up of the capacitive switch wires 120.

The capacitive switch wires 120 may be wire wrap conductors. The wire wrap conductors may be coated with a heat resistant coating called varnish. The varnish is intended to prevent conduction with copper etching of the rear window defrosting wires 118.

The capacitive switch wires 120 may connect, via a mini coaxial cable 700 (see FIG. 7), to a capacitive switch electronic control unit ("ECU") 122 mounted internal to the liftgate 112 (see FIG. 1). Although the capacitive switch ECU 122 is illustrated as positioned below the window 114, a person of ordinary skill in the art will understand that the capacitive switch ECU 122 may be positioned above or on either side of the window 114.

Figure 7:
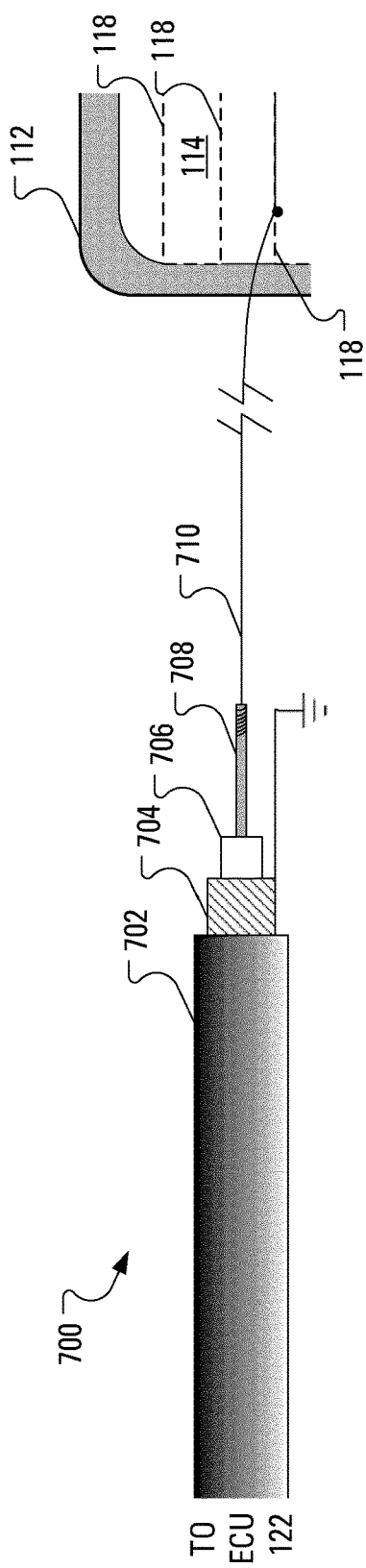
FIG. 7 a connection between one of the capacitive switch wires of FIG. 1 and a mini coaxial cable.

In view of FIG. 7, it may be noted that the mini coaxial cable 700 may include an outer plastic sheath 702, a shield 704, an inner dielectric insulator 706 and a copper core signal wire 708. The copper core signal wire 708 may be soldered to a connecting wire 710 to connect the copper core signal wire 708 to one of the capacitive switch wires 120. The shield 704 may be connected to ground. The connecting wire 710 may be 30 American Wire Gauge (AWG) insulated motor winding wire. Similarly, the capacitive switch wires 120 may also be 30 AWG insulated motor winding wire.

Notably, while the capacitive switch wires 120 may have a circular cross-section, the rear window defrosting wires 118 may have a flat, rectangular cross-section. The diameter of the capacitive switch wires 120 may range, for example, between 0.1602 mm and 0.254 mm (i.e., one 100$^{th}$ of an inch). The width of the rear window defrosting wires 118 may range, for example, between 1 mm and 4 mm.

A switching circuit may be installed between the insulated motor winding wire 710 and the capacitive switch wire 120. See, for example, FIG. 8, which illustrates a switching circuit 804A installed between the insulated motor winding wire 710A and the capacitive switch wire 120A and a switching circuit 804B installed between the insulated motor winding wire 710B and the capacitive switch wire 120B. The switching circuit (collectively or individually referenced as 804) may include two capacitors (not shown) installed in parallel. One capacitor may be called a sensor capacitor. The other capacitor may be called a sample capacitor. The capacitive switch wire 120 may be connected to one side of the sensor capacitor. The other side of the sensor capacitor may be connected to ground. The circuit may be sampled at regular intervals (say, every 15 milliseconds) to compare the voltage level of the sensor capacitor to the voltage level of the sample capacitor. The difference in voltage may be represented as an analog value. Between the sensor capacitor and the sample capacitor may be a normally open relay contact (not shown) that isolates the sensor capacitor from the sample capacitor during voltage comparisons.

For an example switching circuit 804 and a description of the operation of such a switching circuit, see U.S. Pat. No. 6,946,853, which is hereby incorporated herein by reference.

The liftgate 112 also includes a projector 126. The projector 126 may, for example, be a Digital Light Processing ("DLP") projector. With a DLP projector, white light is projected through an array of movable mirrors that control the intensity of each pixel of light as well as the color. Although the projector 126 is illustrated as positioned above the window 114, a person of ordinary skill in the art will understand that the projector 126 may be positioned below or on either side of the window 114.

Figure 8:
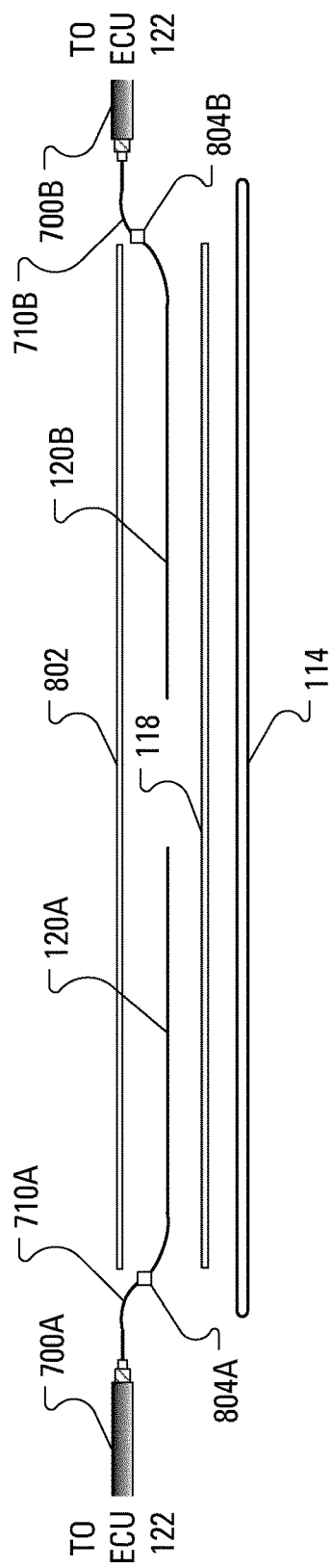
FIG. 8 illustrates, in an exploded cross-sectional view, components of the user interface system associated with the window of FIG. 1.

FIG. 8 illustrates, in an exploded cross-sectional view, components of the user interface system associated with the window 114. Consistent with FIG. 7, the capacitive switch wire 120A is associated with a mini coaxial cable 700A and an insulated motor winding wire 710A. Similarly, the capacitive switch wire 120B is associated with a mini coaxial cable 700B and an insulated motor winding wire 710B. The capacitive switch wires 120 are laid over the rear window defrosting wire 118. A 50% light-catching transparent film 802 may adhered to the interior surface of the window 114 to enhance the visibility of images projected by the projector 126.

Figure 2:
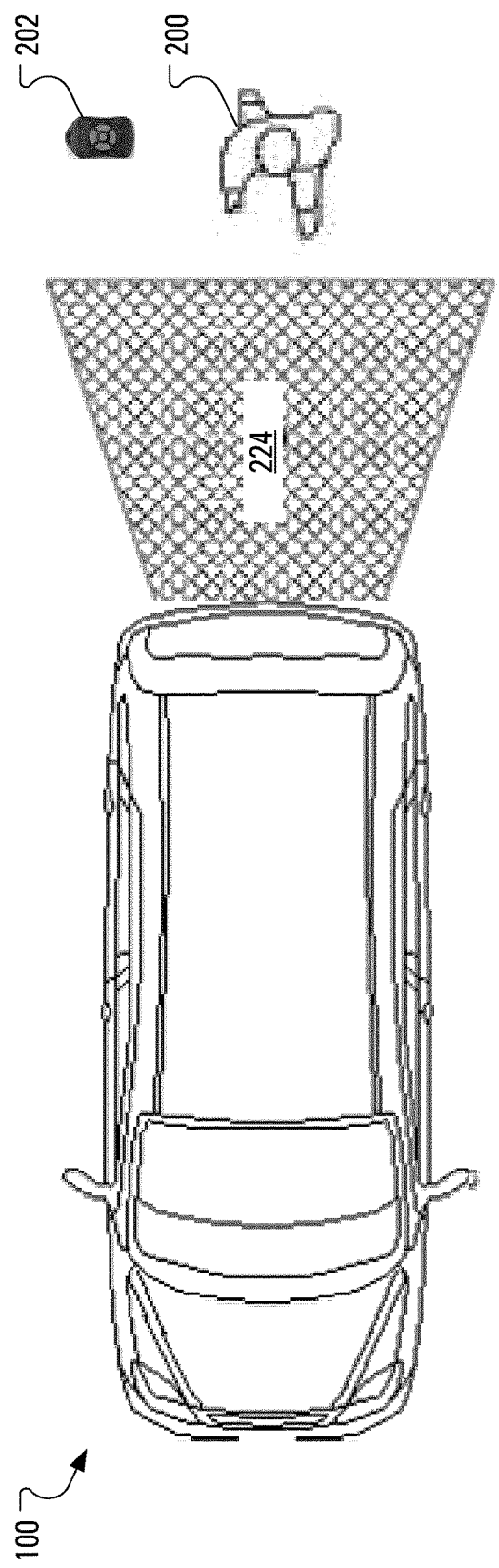
FIG. 2 illustrates the vehicle of FIG. 1, in top view, along with a user and a fob.
Figure 3:
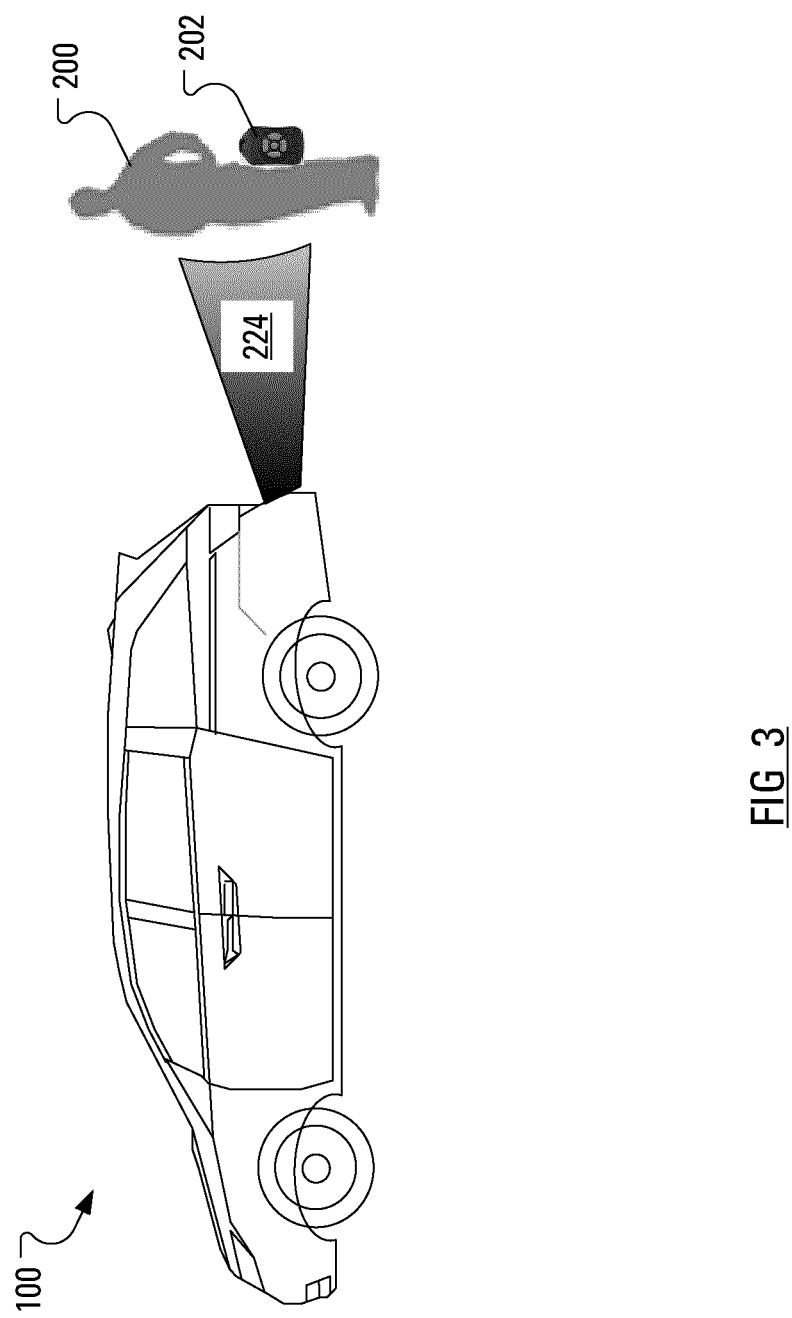
FIG. 3 illustrates the vehicle of FIG. 1, in profile view, along with the user and the fob of FIG. 2.

The vehicle body 116 includes a PKE rear antenna 124. FIG. 2 illustrates the vehicle 100, in top view, along with a user 200 and a PKE fob 202. FIG. 3 illustrates the vehicle 100, in profile view, along with the user 200 and the PKE fob 202. FIGS. 2 and 3 also illustrate a remote keyless entry proximity zone 224, the extent of which depends, at least in part, on characteristics of the PKE rear antenna 124.

Figure 4:
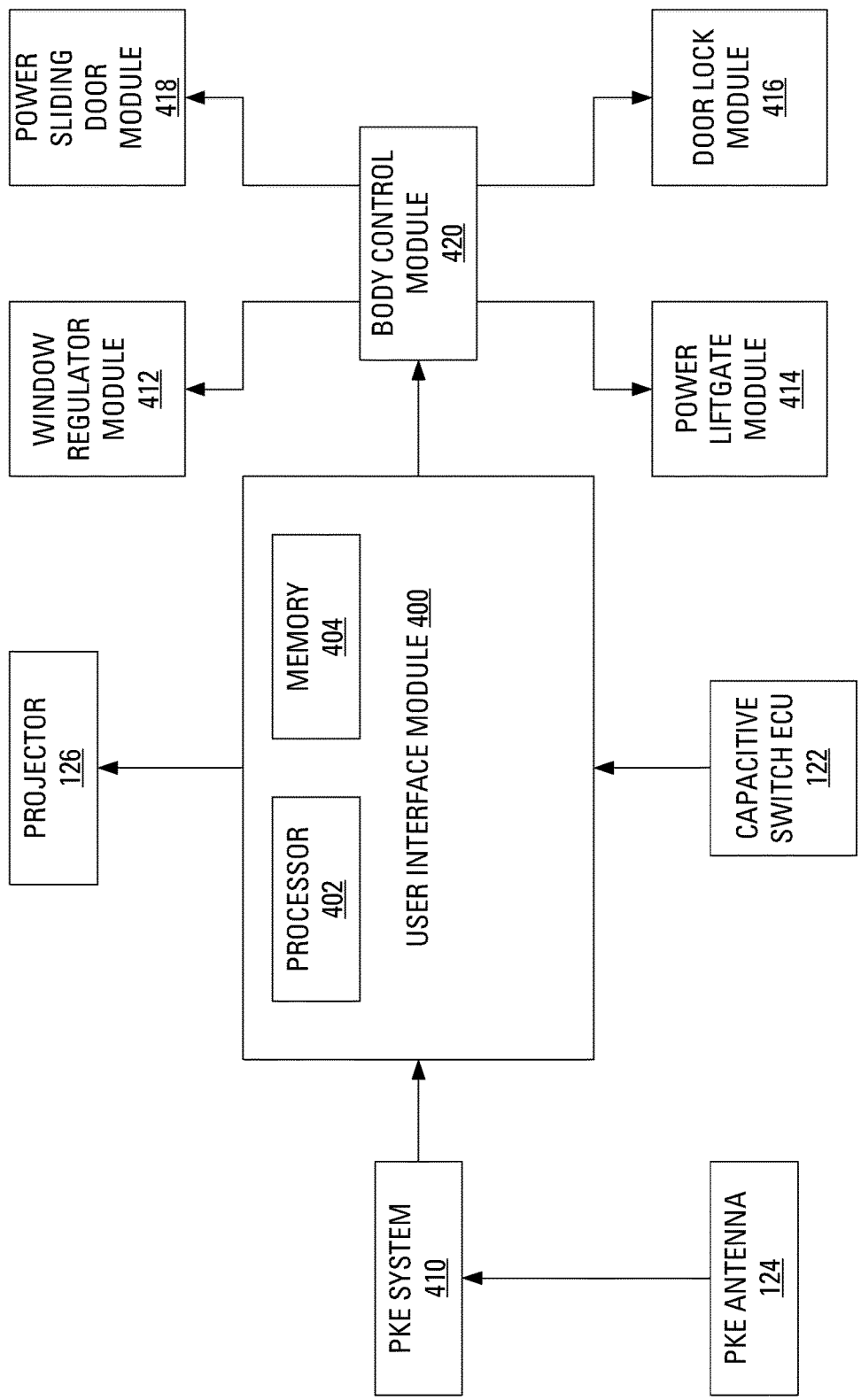
FIG. 4 illustrates, in a block diagram, a user interface module and related elements.

To control the operation of the user interface, the vehicle may include a controller, such as a user interface module 400 as illustrated in a block diagram in FIG. 4. The user interface module 400 includes a processor 402 and a memory 404. The user interface module 400 maintains connections for receiving input from a PKE system 410 and the capacitive switch ECU 122. Additionally, the user interface module 400 maintains connections for providing output to the projector 126 and a body control module 420.

The body control module 420 maintains connections to a plurality of control modules. Example control modules are illustrated in FIG. 4 to include a window regulator module 412, a power sliding door module 418, a power liftgate module 414 and a power door lock module 416.

Although the user interface module 400 has been illustrated as distinct from the capacitive switch ECU 122, the user interface module 400 may, in some embodiments of the present application, be integral with the capacitive switch ECU 122.

Alternatively, the operation of the user interface may be controlled directly by the vehicle's body control module 420.

The capacitive switch ECU 122 may be hard-wired into the vehicle's electrical system so that the capacitive switch ECU 122 may only activate when the vehicle's transmission is in the "P" (Park) position, and when the PKE fob 202 is within proximity of the PKE rear antenna 124.

In operation, in view of FIGS. 2 and 3, as the user 200 approaches the vehicle 100 and enters the proximity zone 224, the PKE rear antenna 124 senses the PKE fob 202. Responsive to sensing the PKE fob 202, the PKE rear antenna 124 may communicate with the PKE system 410 (FIG. 4) to authenticate the PKE fob 202. Authenticating the PKE fob 202, at the PKE system 410, may, for example, involve verifying encryption. That is, authenticating the PKE fob 202, at the PKE system 410, may involve successfully decrypting a message that has been transmitted from the PKE fob 202, received by the PKE rear antenna 124 and passed to the PKE system 410.

In an alternative arrangement (not shown), the PKE rear antenna 124 may transmit messages to the body control module 420 (FIG. 4), which messages are then transmitted from the body control module 420 to the PKE system 410.

Responsive to receiving an indication, from the PKE system 410, that the PKE fob 202 has been successfully authenticated, the user interface module 400 may activate the user interface. Activation of the user interface may involve instructing the projector 126 to project a plurality of images on the window 114 of the liftgate 112. Five example images are illustrated in FIG. 1 associated with reference numerals 130A, 130B, 130C 130D and 130E. Individually or collectively, the images may simply be referred to using reference number 130.

The images 130 are presented in an example layout wherein the images 130 appears as the pips on the "five" side of a die. That is, the image 130A is positioned top left (when viewed from behind the vehicle 100), the image 130 is positioned top right, the image 130D is positioned bottom left, the image 130E is positioned bottom right and the image 130C is positioned in the center of the other four images 130. Of course, it will be appreciated by a person of ordinary skill in the art that different numbers of images may be projected and that the images may be positioned relative to one another in a manner distinct from the manner illustrated in FIG. 1.

Figure 5:
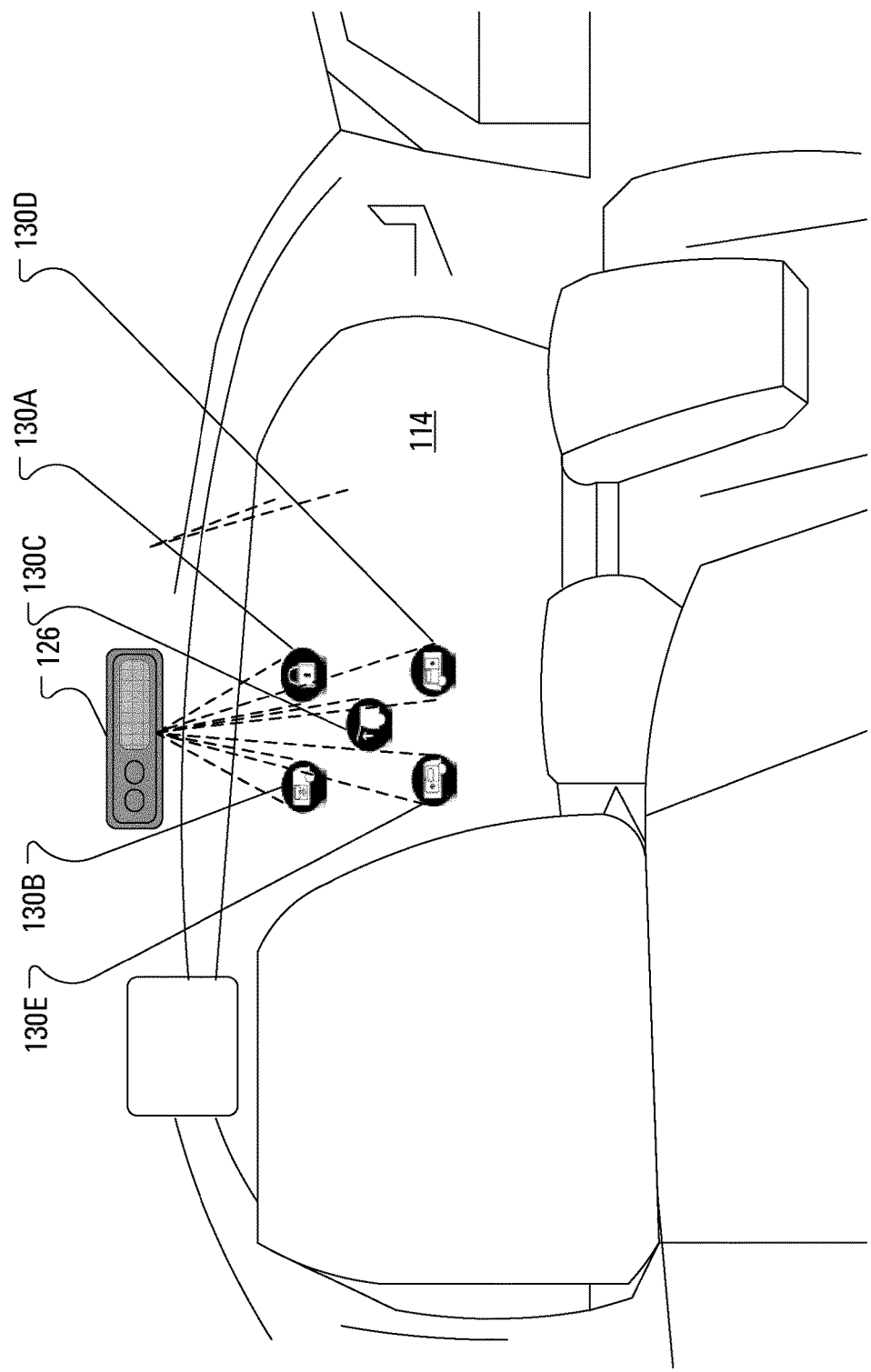
FIG. 5 illustrates the window with the images of FIG. 1 projected thereon by the projector.

The projector 126 may project the images 130 onto the window 114 at a terminus of each of the capacitive switch wires 120 so that, for example, the image 130A is associated with the capacitive switch wire 120A. The window 114 with the images 130 projected thereon by the projector 126 is presented in FIG. 5, from an inside the vehicle perspective. It will be clear to a person of ordinary skill in the art that FIG. 5 illustrates the manner in which the projector 126 projects on to the window 114 to make the display visible from the outside of the vehicle 100, for example, by the user 200 in FIG. 2.

Each image 130 may be labeled with an unique inscription representative of a particular operation. Such operation representative inscriptions may include: Lock/Unlock All Doors; Open All Windows; Open Left Side Rear Door; Open Right Side Rear Door; Open Liftgate; Start Vehicle; and Sound Panic Alarm.

Activation of the user interface may also involve transmitting an instruction to the capacitive switch ECU 122, where the instruction indicates that the capacitive switch ECU 122 should expect input.

The user may, for example, wish to request that all doors be unlocked. Assuming that the image 130A is associated with unlocking all doors, the user 200 may press directly onto the exterior of the portion of the window 114 corresponding to the interior portion of the window 114 onto which the image 130A has been projected by the projector 126. Alternatively, the user 200 may swipe the window 114 within a short distance of the exterior of the portion of the window 114 corresponding to the interior portion of the window 114 onto which the image 130A has been projected by the projector 126.

Figure 9:
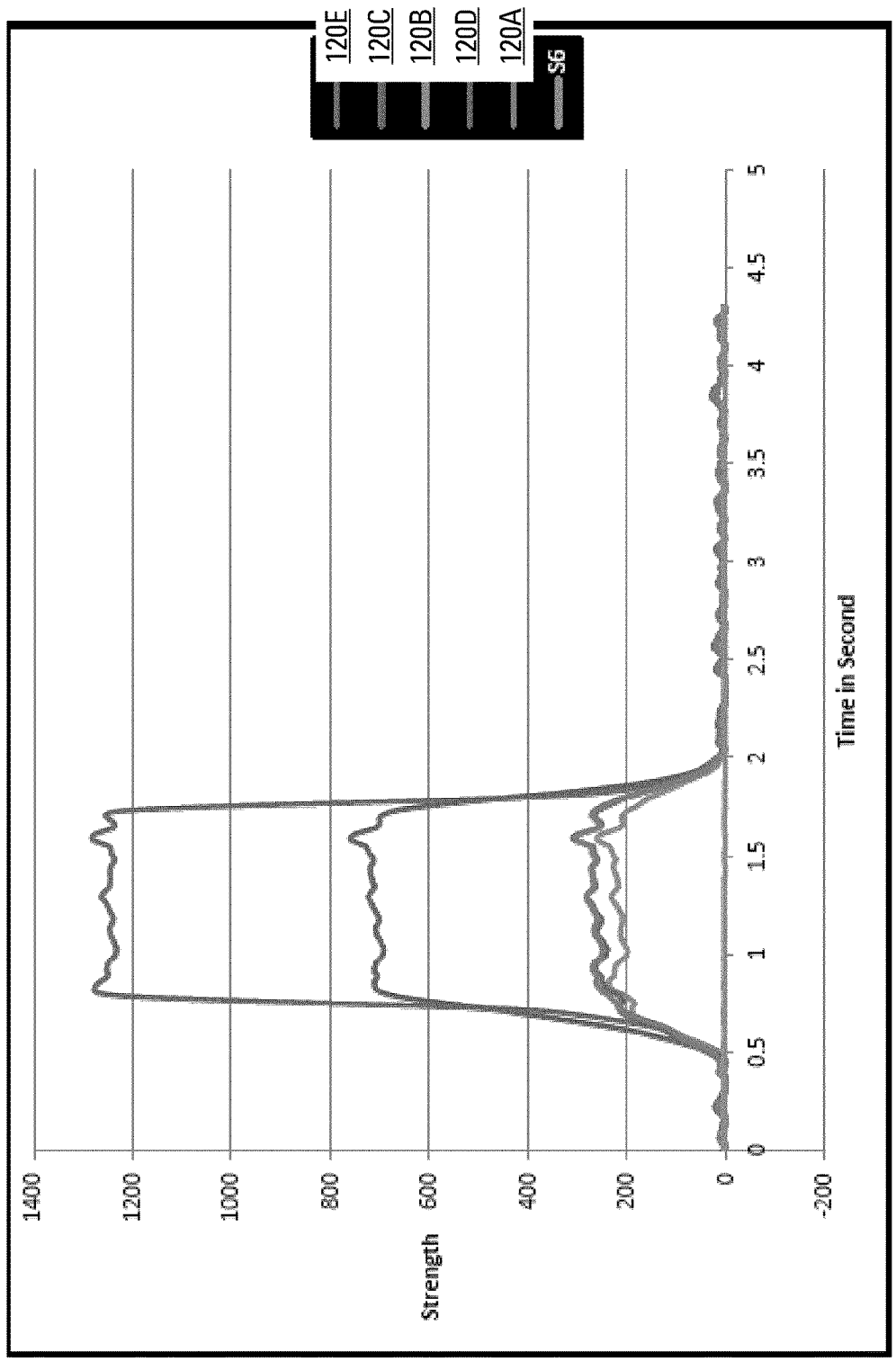
FIG. 9 illustrates a plot of signals based on changes sensed by the capacitive switch wires of FIG. 1.

FIG. 9 illustrates signals received, at the capacitive switch ECU 122, based on changes sensed by the capacitive switch wires 120. In particular, FIG. 9 illustrates signals received responsive to the user 200 contacting the exterior of the portion of the window 114 corresponding to the interior portion of the window 114 onto which the image 130A has been projected by the projector 126.

Responsive to sensing a change in the capacitance at the end of the capacitive switch wire 120A, the capacitive switch ECU 122, which has been monitoring the capacitive switch wire 120A, registers receipt of a command request.

In general, upon registering receipt of a command request, the capacitive switch ECU 122 may transmit, to the user interface module 400, an indication of receipt of the command request.

Figure 6:
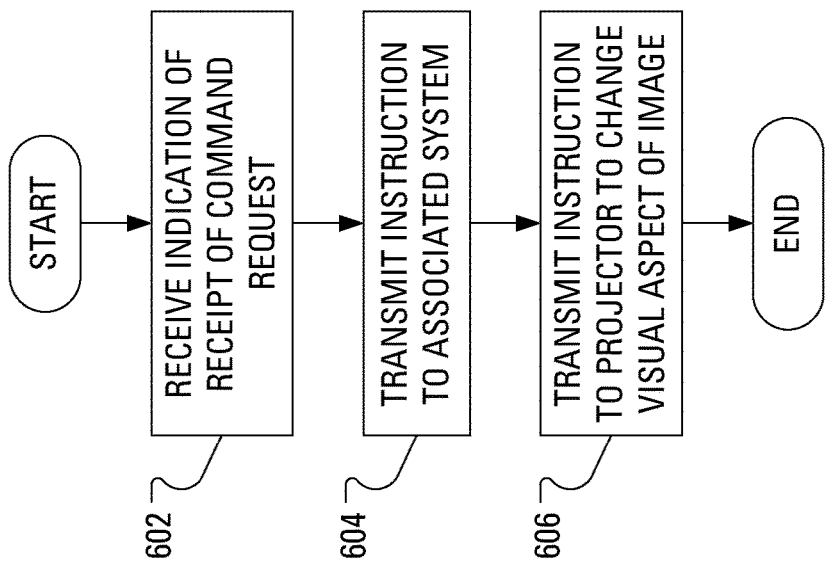
FIG. 6 illustrates example steps in a method of operation for the user interface module of FIG. 4.

Example steps in a method of operation for the user interface module 400 are illustrated in FIG. 6. Responsive to receiving (step 602) the indication of receipt of the command request, the user interface module 400 may transmit (step 604) an instruction to the body control module 420.

The user interface module 400 may also initiate provision of feedback to the user 200. Such feedback may include controlling (step 606) the projector 126 to change a visual aspect of the image 130A. Changeable visual aspects of the images 130 include a color and the inscription. Furthermore, the image may be altered. For example, an image of a closed locked may be changed to an image of an open lock after activation. Similarly, an image of an open door may be changed to an image of a closed door.

In the current example, since the capacitive switch ECU 122 has sensed a change in capacitance at the capacitive switch wire 120A, the capacitive switch ECU 122 may transmit, to the user interface module 400, an indication of receipt of an "unlock all doors" command request. Responsive to receiving (step 602) the indication of receipt of the command request, the user interface module 400 may transmit (step 604) an "unlock all doors" instruction to the body control module 420. Alternatively, the user interface module 400 may transmit an "unlock" instruction to each of a plurality of systems (not shown) directly associated with each door's electric lock.

Responsive to receiving the "unlock all doors" instruction, the body control module 420 may generate and transmit an "unlock all doors" instruction to the power door lock module 416. Responsive to receiving the "unlock all doors" instruction from the body control module 420 the power door lock module 416 may control the locks on each door to change state from locked to unlocked.

Continuing the present example, the image 130A may include a white inscription reading "Unlock All Doors" on a blue background. The user interface module 400 may not only transmit (step 604) an "unlock all doors" instruction to the body control module 420, but may also transmit (step 606) an instruction to the projector 126 to change the image 130A. Changes to the image 130A may include changing the background color of the image 130A from blue to green and/or changing the inscription from "Unlock All Doors" to "Lock All Doors," thereby acknowledging that the door unlocking command has been received and carried out.

The user interface module 400 may be configured to control the projector 126 to display other information. For example, using Bluetooth™ or other short-range communication protocol, the user interface module 400 may communicate with a user's mobile communication device. Properly configured, the user interface module 400 may, for one example, control the projector 126 to present, to the user 200, recently received email messages or recently received status updates from social media such as Twitter™ and Facebook™. Indeed, if the vehicle 100 is equipped with data networking capabilities, a short-range network connection to a user's mobile communication device may not be necessary to obtain such updates.

In another configuration, the user interface module 400 may, for another example, control the projector 126 to present, to the user 200, a replica of that which is being displayed on the user's mobile communication device. Such replication of that which is being displayed on another device is sometimes called "mirroring." Advantageously, such mirroring may be used to share photos or videos, share a presentation or to provide a display for a game, where the display is significantly larger than the display associated with the user's mobile communication device.

The user interface module 400 may, for another example, control the projector 126 to present, to the user 200, maps and/or telemetry information generated by a global positioning system (GPS) receiver integral to the vehicle 100 or carried by the user 200.

The user interface module 400 may, for another example, control the projector 126 to present, to the user 200, vehicle alarm warnings.

The user interface module 400 may, for another example, control the projector 126 to present, to anyone observing the vehicle 100, a display of a request for roadside assistance.

The user interface module 400 may, for another example, control the projector 126 to present commercial advertising, which may take the form of a simple static image, such a logo, or may take the form of video, such as a television advertisement. Notably, such advertising may be presented even the absence of the user 200, as represented by presence, in the proximity zone 224, of the PKE fob 202. Given a suitable amount of power, the vehicle, while left in a parking lot by the user 200, may present advertising to passers-by.

The elements of the user interface system of the present disclosure include a manner in which to display images on the window 114 of the liftgate 112 and a manner in which to receive input from the user 200. The manner in which to display images has, to this point, been disclosed as the projector 126. The manner in which to receive input from the user 200 has, to this point, been disclosed as the capacitive switch wires 120 in combination with the capacitive switch ECU 122.

Further output and input alternatives are contemplated.

For one example output alternative, it is contemplated that, rather than project images onto the window 114, the window 114 may be specifically implemented as smart glass. The term "smart glass" refers generally to glass or glazing that changes light transmission properties when voltage, light or heat is applied. One example of such technology is polymer dispersed liquid crystal devices. It is understood that, rather that changing light transmission properties of an entire pane of glass, the light transmission properties of specific regions of a pane of glass may be selectively changed. For example, rather than projecting, using the projector 126, the images 130 onto the window 114. The window 114 could be controlled, by a smart glass controller, to change the light transmission properties of regions of the window 114 in a manner that presents the images 130.

Figure 10:
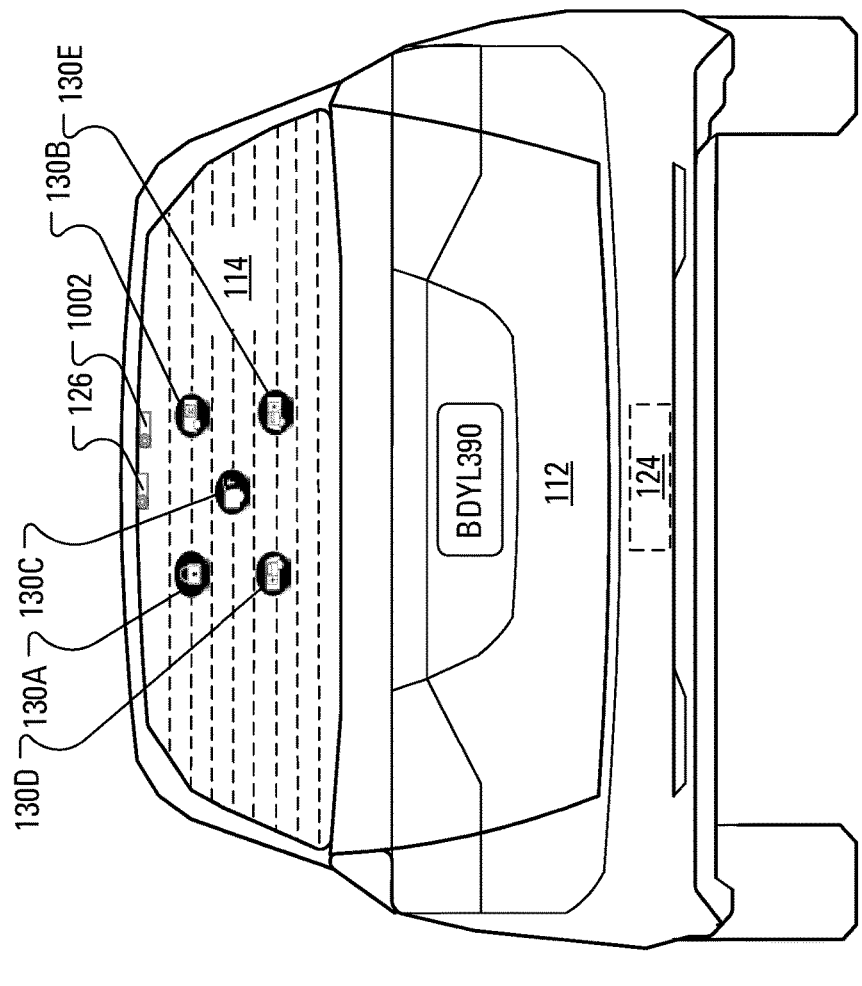
FIG. 10 illustrates, in rear view, a vehicle with a user interface including an eye-tracking camera in accordance with an embodiment of an aspect of the present disclosure.

For one example input alternative, it is contemplated that, rather than employ the capacitive switch wires 120 in combination with the capacitive switch ECU 122, the user interface system may be equipped with an eye-tracking camera. FIG. 10 illustrates, in rear view, a vehicle 1000 illustrating a user interface in accordance with an embodiment of an aspect of the present disclosure and an eye-tracking camera 1002. To interact with the user interface system, the user 200 need only gaze at one of the images 130 to select the image 130. The eye-tracking camera 1002 may transmit, to the user interface module 400, an indication of receipt of a command request. Responsive to receiving the indication of receipt of the command request, the user interface module 400 may transmit (as described hereinbefore with reference to FIG. 6) an instruction to a system associated with the selected image 130, thereby causing an operation associated with the selected image 130 to be initiated.

The user interface system in the vehicle 1000 of FIG. 10 may be adapted for eye gesture input rather than the eye tracking input already described. To interact with the user interface system, the user 200 may direct the user's eyes to a "user area" on the window 114. The user 200 may then direct the user's eyes to execute a motion, which may be considered an "eye gesture." An "eye gesture" may be an action that follows directly after cessation of the user's eye motion. The eye-tracking camera 1002, upon detecting an eye gesture associated with a command request, may transmit, to the user interface module 400, an indication of receipt of the command request. Responsive to receiving the indication of receipt of the command request, the user interface module 400 may transmit (as described hereinbefore with reference to FIG. 6) an instruction to a system associated with the command request, thereby causing an operation associated with the command request to be initiated.

Figure 11:
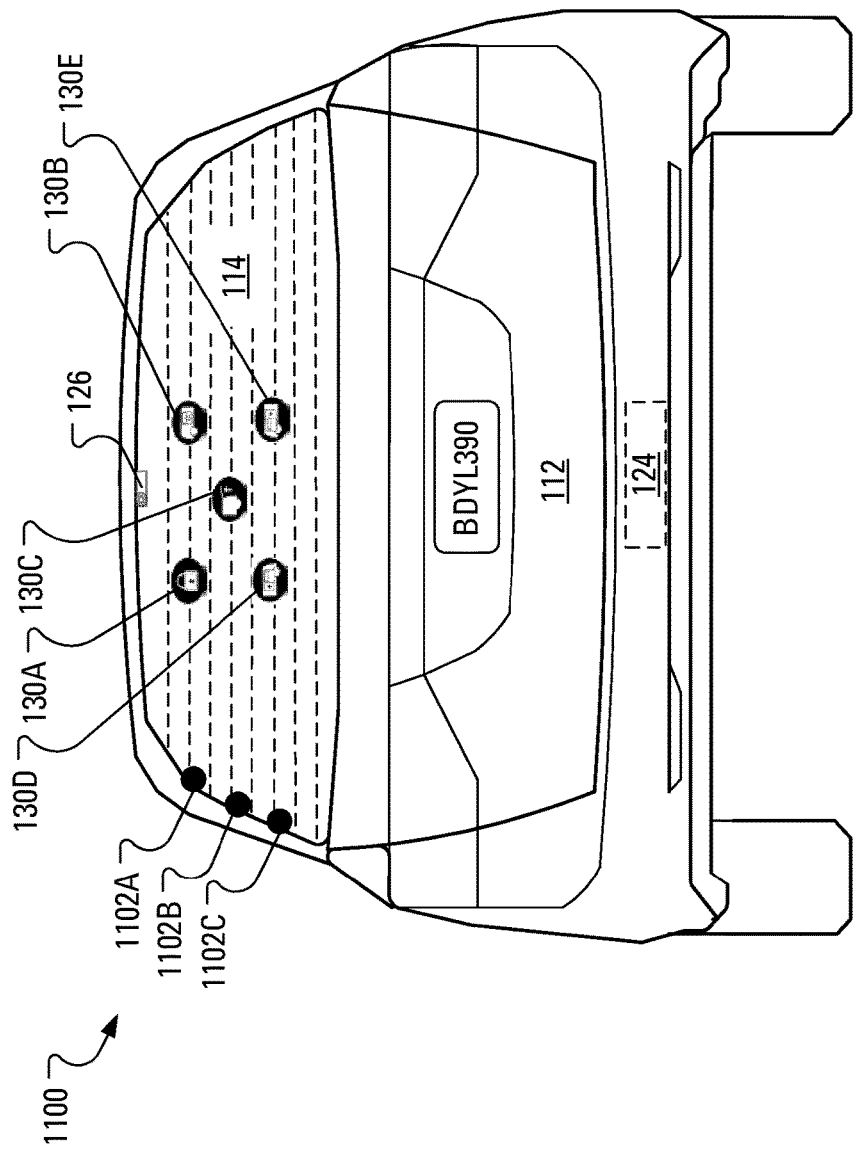
FIG. 11 illustrates, in rear view, a vehicle with a user interface including a set of ultrasonic sensors in accordance with an embodiment of an aspect of the present disclosure.

For a second example input alternative, it is contemplated that, rather than employ the capacitive switch wires 120 in combination with the capacitive switch ECU 122, the user interface system may be equipped with a set of ultrasonic sensors. FIG. 11 illustrates, in rear view, a vehicle 1100 illustrating a user interface in accordance with an embodiment of an aspect of the present disclosure with a first ultrasonic sensor 1102A, a second ultrasonic sensor 1102B and a third ultrasonic sensor 1102C (referenced collectively or individually as 1102). The ultrasonic sensors 1102 operate on a principle similar to RADAR or SONAR in that attributes of a target are evaluated through interpretation of echoes. The ultrasonic sensors 1102 generate high frequency sound waves and evaluate each sound wave that is echoed back to the ultrasonic sensor 1102. The ultrasonic sensors 1102 determine a time interval between the sending of an original signal and the receiving of an echo of the same signal to determine a distance to an object. It is contemplated that the set of ultrasonic sensors 1102 installed along an edge of the window 114 should be able to sense the user 200 indicating a selection of one of the images 130. A given one of the ultrasonic sensors 1102 may transmit, to the user interface module 400, an indication of receipt of a command request. Responsive to receiving the indication of receipt of the command request, the user interface module 400 may transmit (as described hereinbefore with reference to FIG. 6) an instruction to a system associated with the selected image 130, thereby causing an operation associated with the selected image 130 to be initiated.

For a third example input alternative, it is contemplated that, rather than employ the capacitive switch wires 120 in combination with the capacitive switch ECU 122, the user interface system may be equipped with one or more cameras adapted to receive infrared light. Infrared (IR) light is electromagnetic radiation with wavelengths longer than those of visible light, extending from the nominal red edge of the visible spectrum at 700 nanometers (nm) to 1 mm. This range of wavelengths corresponds to a frequency range of approximately 430 THz down to 300 GHz.

Figure 12:
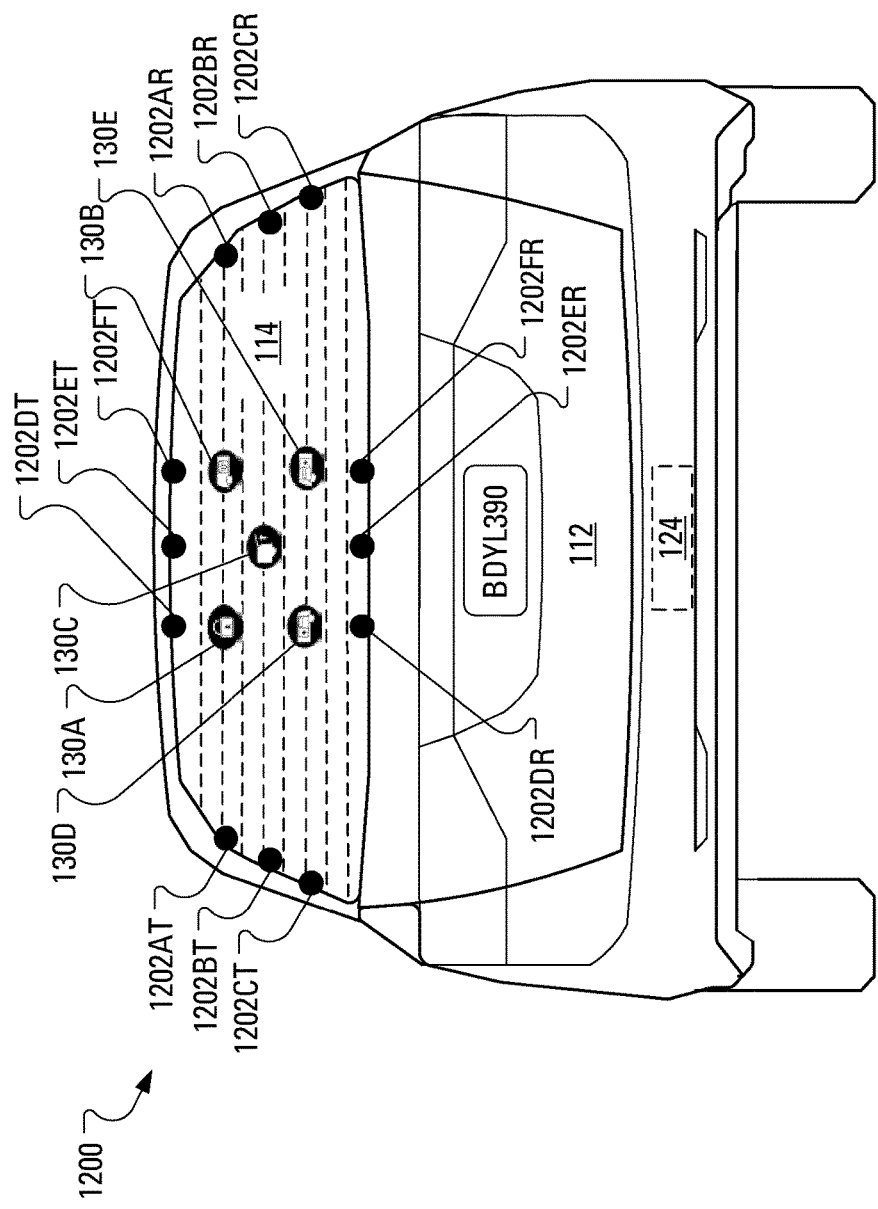
FIG. 12 illustrates, in rear view, a vehicle with a user interface including a set of IR emitters and corresponding receivers in accordance with an embodiment of an aspect of the present disclosure.

It is contemplated that a set of IR emitters and receivers may be mounted near the window 114 to sense that the user 200 is indicating a selection of a particular one of the images 130 through detection that the finger of the user 200 is positioned proximate to the particular one of the images 130. FIG. 12 illustrates, in rear view, a vehicle 1200 illustrating a user interface in accordance with an embodiment of an aspect of the present disclosure and a set of IR emitters and receivers.

A first IR emitter 1202AT is paired with a first IR receiver 1202AR. A second IR emitter 1202BT is paired with a second IR receiver 1202BR. A third IR emitter 1202CT is paired with a third IR receiver 1202CR. A fourth IR emitter 1202DT is paired with a fourth IR receiver 1202DR. A fifth IR emitter 1202ET is paired with a fifth IR receiver 1202ER. A sixth IR emitter 1202FT is paired with a sixth IR receiver 1202FR. The IR receivers, collectively referenced as 1202R, may be associated with a IR receiver control unit (not shown).

Responsive to the user 200 moving a finger proximate to the first image 130A, IR emissions from the first IR emitter 1202AT, which emissions are normally received by the first IR receiver 1202AR, will be interrupted. Similarly, IR emissions from the fourth IR emitter 1202DT, which emissions are normally received by the fourth IR receiver 1202DR, will also be interrupted. Responsive to signals received from the first IR receiver 1202AR and the fourth IR receiver 1202DR, the IR receiver control unit may determine that the user 200 is intending to select the first image 130.

The IR receiver control unit may transmit, to the user interface module 400, an indication of receipt of a command request. Responsive to receiving the indication of receipt of the command request, the user interface module 400 may transmit (as described hereinbefore with reference to FIG. 6) an instruction to a system associated with the first image 130A, thereby causing an operation associated with the first image 130A to be initiated.

For a fourth example input alternative, it is contemplated that, rather than employ the capacitive switch wires 120 in combination with the capacitive switch ECU 122, the user interface system may be configured to receive input from one or more sensors.

In this example, the control is less about the operation of a user interface, and more about controlling an image display mechanism 1306 in various ways. The image display mechanism 1306 may, as discussed hereinbefore, involve the projector 126 or may involve a "smart glass" version of the window 114, for but two examples. Notably, in a "smart glass" version of the window 114, the image display mechanism 1306 may carry out both an output (display) role and an input role. Input received at the image display mechanism 1306 may lead to the image display mechanism 1306 transmitting information and/or commends to the display, access and information module 1300. The vehicle may include a controller, such as a display, access and information module 1300 as illustrated in a block diagram in FIG. 13. The display, access and information module 1300 includes a processor 1302 and a memory 1304. The display, access and information module 1300 maintains connections for receiving input from a sensor system 1310. Additionally, the user interface module 400 maintains connections for providing output to the image display mechanism 1306 and the body control module 420.

The sensor system 1310 may maintain connections with a plurality of sensors, such as an occupant sensor 1322, a brake sensor 1324, a thermometer 1326, a turn signal sensor 1328, a transmission sensor 1330 and a hazard sensor 1332.

In operation, the window 114 may be used as a display for various types of information, beyond that which has been disclosed hereinbefore.

For one example, a display, controlled by the image display mechanism 1306 to appear externally on the window 114, may be used to augment or replace brake lights. A driver may, in one instance, activate vehicle brakes by depressing a brake pedal, as is conventional. Responsive to sensing, at the brake sensor 1324, the depression of the brake pedal, the brake sensor 1324 may signal the sensor system 1310. In turn, the sensor system 1310 may signal the display, access and information module 1300 with an indication that the brake pedal has been depressed. Responsive to receiving this indication, the display, access and information module 1300 may signal the image display mechanism 1306 to display, on the window 114, a rectangle of red light, indicative of the vehicle slowing down.

Figure 14:
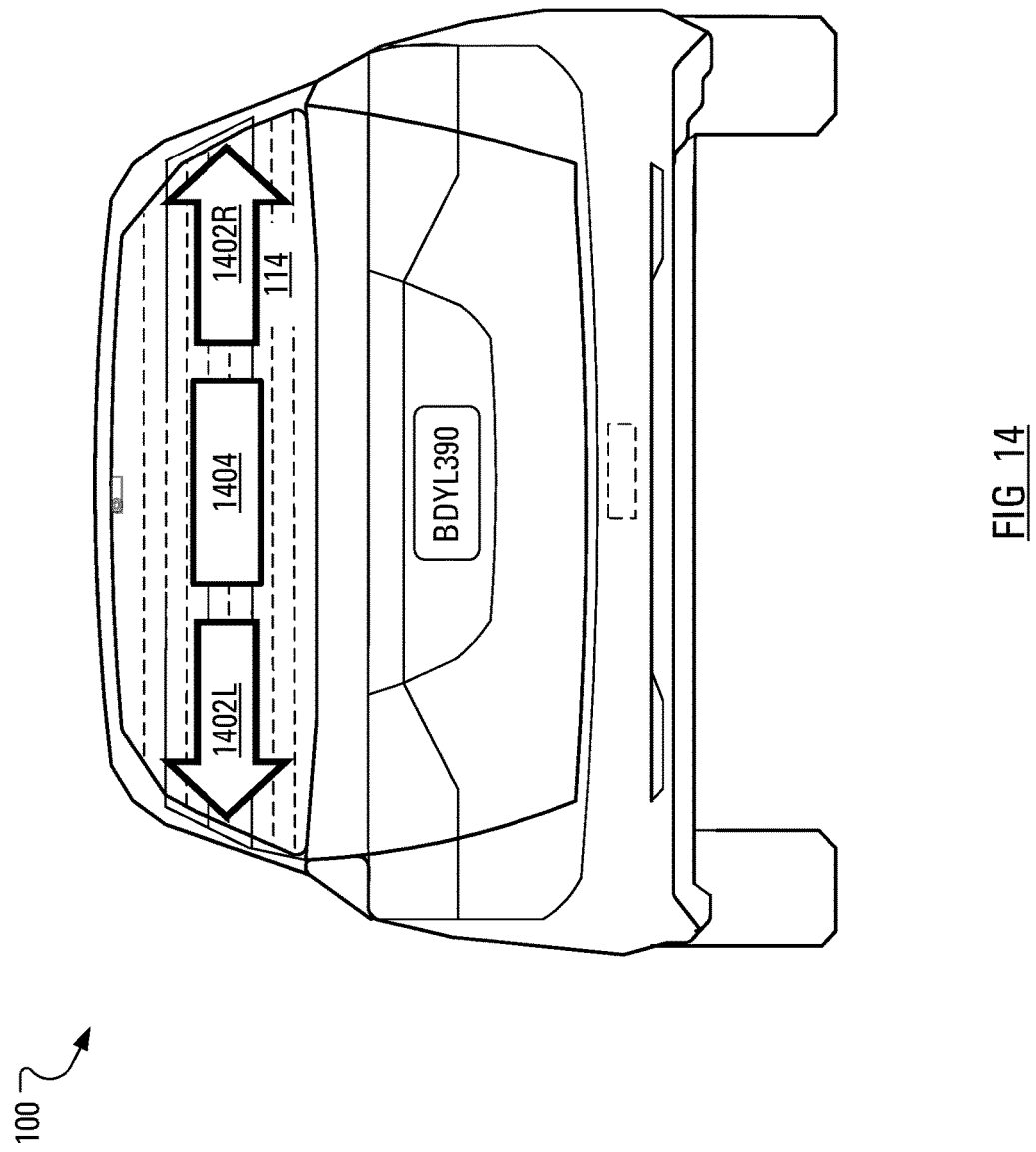
FIG. 14 illustrates, for the vehicle of FIG. 1, multiple instances of a display triggered by the sensors of FIG. 13.

FIG. 14 illustrates, for the vehicle 100 with the window 114, a particular instance of a display triggered by sensors. The rectangle of red light, may, for example, appear in a zone of the window 114 associated with reference numeral 1404.

For another example, a display, controlled by the image display mechanism 1306 to appear externally on the window 114, may be used to augment or replace turn signals. A driver may, in one instance, activate a right turn signal by changing angular position of a turn signal arm, as is conventional. Responsive to sensing, at the turn signal sensor 1328, the changing angular position, the turn signal sensor 1328 may signal the sensor system 1310. In turn, the sensor system 1310 may signal the display, access and information module 1300 with an indication that the turn signal arm has changed angular position. Responsive to receiving this indication, the display, access and information module 1300 may signal the image display mechanism 1306 to display, on the window 114, an arrow of red light (see 1402R in FIG. 14), indicative of the vehicle planning to turn right.

Of course, once turn signals are implemented, it may be considered straightforward to implement hazard lights. That is, a display, controlled by the image display mechanism 1306 to appear externally on the window 114 may be used to augment or replace hazard lights. A driver may, in one instance, activate hazard lights by depressing a dashboard hazard button, as is conventional. Responsive to sensing, at the hazard sensor 1332, the depression of the hazard button, the hazard sensor 1332 may signal the sensor system 1310. In turn, the sensor system 1310 may signal the display, access and information module 1300 with an indication that the hazard button has been depressed. Responsive to receiving this indication, the display, access and information module 1300 may signal the image display mechanism 1306 to display, on the window 114, a pair of arrows of red light, with one arrow pointing right (see 1402R in FIG. 14) and one arrow pointing left (see 1402L in FIG. 14).

For a further example, a display, controlled by the image display mechanism 1306 to appear externally on the window 114 may be used to augment or replace a reversing light. A driver may, in one instance, shift the vehicle transmission into reverse gear, as is conventional. Responsive to sensing, at the transmission sensor 1330, the shifting of the vehicle transmission into reverse gear, the transmission sensor 1330 may signal the sensor system 1310. In turn, the sensor system 1310 may signal the display, access and information module 1300 with an indication that the vehicle transmission has been shifted into reverse gear. Responsive to receiving this indication, the display, access and information module 1300 may signal the image display mechanism 1306 to display, on the window 114, a rectangle of white light (see 1404 in FIG. 14), indicative of the vehicle backing up.

Figure 15:
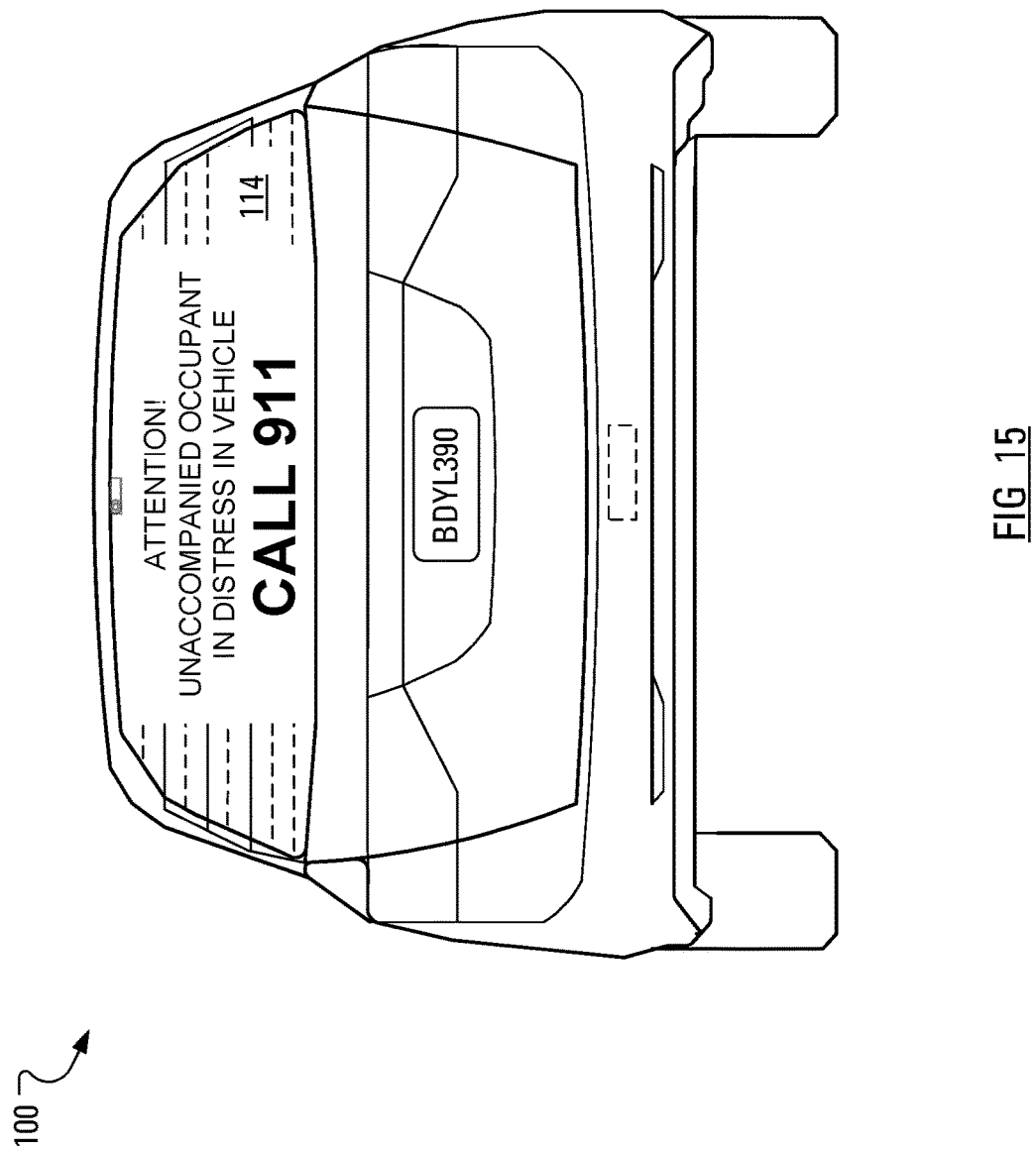
FIG. 15 illustrates, for the vehicle of FIG. 1, a particular instance of a display triggered by the sensors of FIG. 13.

FIG. 15 illustrates, for the vehicle 100 with the window 114, a particular instance of a display triggered by sensors. For still another example, a display, controlled by the image display mechanism 1306 to appear externally on the window 114 may be used to indicate potential for an occupant in distress. The thermometer 1326 may, periodically, report a vehicle interior temperature to the sensor system 1310, which may pass an indication of the vehicle interior temperature to the display, access and information module 1300. Additionally, the occupant sensor 1322 may, periodically, report a vehicle occupant status (e.g., present or absent) to the sensor system 1310, which may pass an indication of the vehicle occupant status to the display, access and information module 1300. The processor 1302 of the display, access and information module 1300 may execute logic in the form a program stored in the memory 1304 to determine, based on the input from the sensor system 1310 whether an occupant of the vehicle may be in distress. Responsive to determining that an occupant of the vehicle may be in distress, the display, access and information module 1300 may signal the image display mechanism 1306 to display, on the window 114, an indication that an occupant of the vehicle may be in distress.

Notably, other measures may also be taken toward ensuring the safety of the occupant, whether the occupant is a child, a pet or even an unconscious adult. For example, responsive to determining that an occupant of the vehicle may be in distress, the display, access and information module 1300 may control the power door lock module 416 to unlock the doors such that the occupant may be removed from the vehicle 1400. Alternatively, responsive to determining that an occupant of the vehicle may be in distress, the display, access and information module 1300 may control the window regulator module 412 to open one or more of the windows of the vehicle 1414 to allow venting of hot air.

The occupant sensor 1322 may take on one or more of many forms: a pressure sensor may detect an occupant on a seat of the vehicle; and/or a motion sensor may detect movement within the vehicle, etc.

Figure 16:
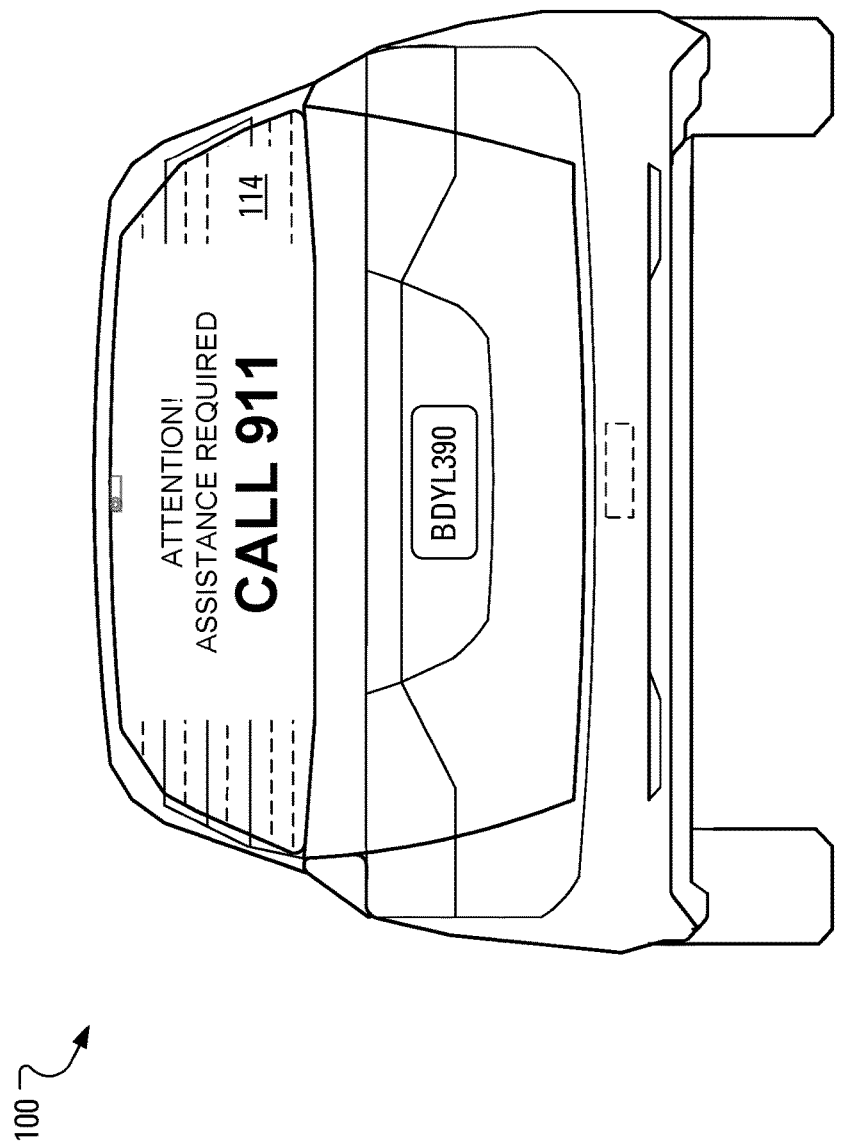
FIG. 16 illustrates, for the vehicle of FIG. 1, a particular instance of a display triggered by the sensors of FIG. 13.

FIG. 16 illustrates, for the vehicle 100 with the window 114, a particular instance of a display triggered by sensors. For still another example, a display, controlled by the image display mechanism 1306 to appear externally on the window 114, may be used to indicate potential for a driver in distress. Responsive to activation of a secret safety switch (not shown), a secret safety switch sensor (not shown) may signal to the sensor system 1310, which may pass an indication of a "driver in need of assistance" status to the display, access and information module 1300. Responsive to determining that the "driver in need of assistance" status indication has been received, the display, access and information module 1300 may signal the image display mechanism 1306 to display, on the window 114, an indication that an occupant of the vehicle may be in distress.

Figure 13:
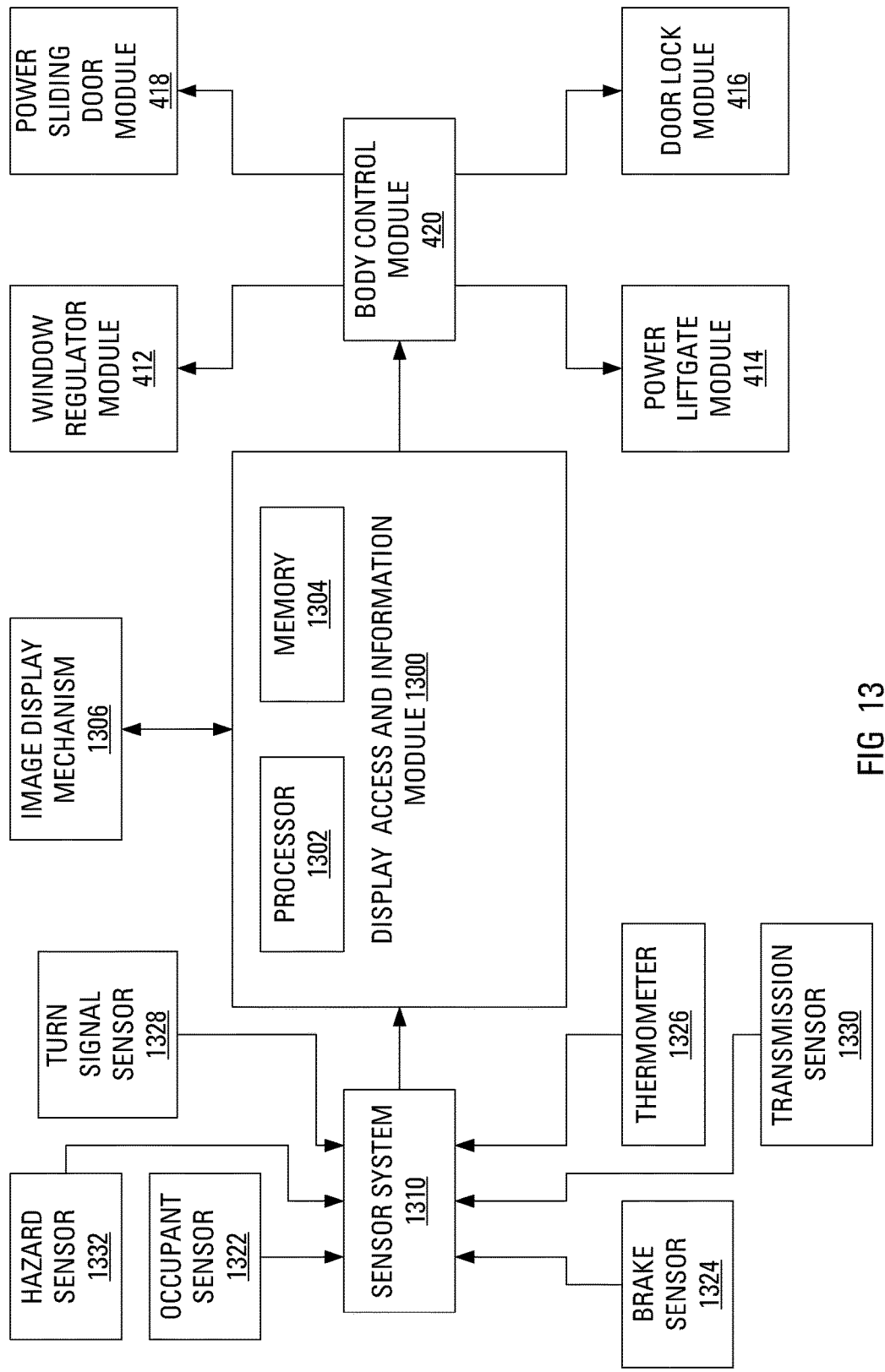
FIG. 13 illustrates, in a block diagram, a display, access and information module, related elements and sensors.

While FIG. 13 illustrates the sensor system 1310 as an intermediary between various sensors and the display, access and information module 1300, it is contemplated that one or more of the various sensors may connect to the display, access and information module 1300 directly, without the intermediary sensor system 1310.

Figure 17:
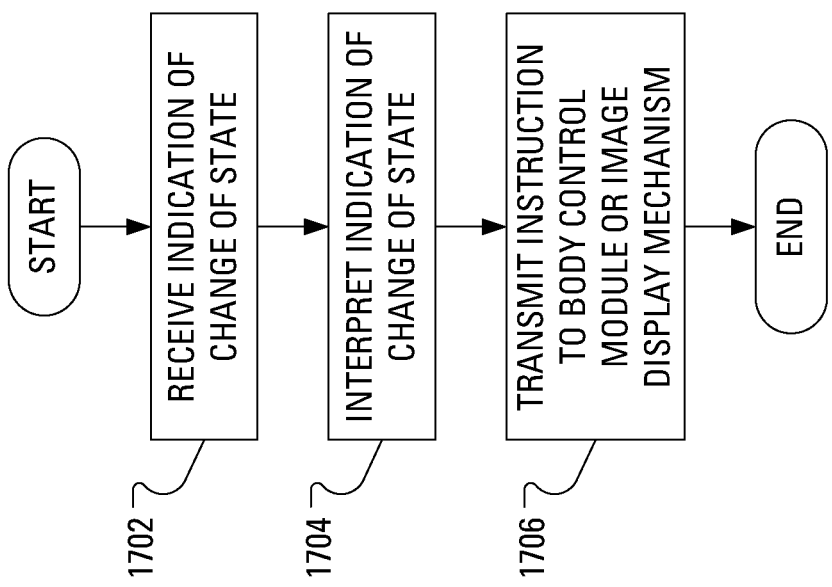
FIG. 17 illustrates example steps in a method of operation for the display, access and information module of FIG. 13.

In FIG. 17, example steps in a method of operation for the display, access and information module 1300 are illustrated. In general, it may be considered that the various sensors detect a change in state of an element of the vehicle, whether the element of the vehicle is a brake pedal, a turn signal arm, a dashboard button, a gear shifter, a pressure sensor, a motion detector or a thermometer. The sensors report the change of state to the sensor system 1310, which, in turn, transmits an indication of the change in state to the display, access and information module 1300. Upon receiving (step 1702) the indication, the display, access and information module 1300 interprets (step 1704) the indication to determine an instruction and a module to which the instruction relates. The display, access and information module 1300 may then transmit (step 1706) the instruction to the body control module 420 or to the image display mechanism 1306.

FIG. 18 illustrates a further embodiment of the present application, wherein the display, access and information module 1300 may signal the image display mechanism 1306 to cause an advertizing message to appear externally on the window 114. Rather than relying on particular activation of a switch by a driver or other occupant, the display, access and information module 1300 may signal the advertizing to appear when the window 114 is not being used to display information related to operation of the vehicle 100 or safety of the occupants therein. However, to avoid distracting other drivers, a speed sensor (not shown) may be used to sense when the vehicle 100 has come to a stop. The display, access and information module 1300, upon receiving (step 1702) an indication that the vehicle 100 has come to a stop, may interpret (step 1704) the indication and transmit (step 1706) a signal to the image display mechanism 1306 to cause an advertizing message to appear.

Notably, while the present application has focused largely on a display presented on a liftgate window, it should be understood that other windows, such as a rear side quarter window, may be used for the display.

In the user interface system, the image display mechanism may comprise a projector adapted to project the plurality of images onto the portion of the closure, the image display mechanism may comprise a controller adapted to change light transmission properties of regions of the portion of the closure in a manner that presents the plurality of images, the image display mechanism may be further adapted to cause display of advertising, the image display mechanism may be further adapted to cause display of a request for roadside assistance, the image display mechanism may be further adapted to cause display of vehicle alarm warnings; the image display mechanism may be further adapted to cause display of a map and the image display mechanism may be further adapted to cause display of a replica of that which is being displayed on a mobile communication device.

In the user interface system, the sensor may comprise a capacitive switch wire having a switch wire portion mounted to the portion of the closure, the switch wire portion ending at a terminus and a capacitive switch control unit connected to the capacitive switch wire and adapted to interpret a change a capacitance near the terminus of the capacitive switch wire as the selection of the particular image, where the particular image is displayed proximate the terminus. In the user interface system, the sensor may comprise an eye tracking camera, the sensor may comprise an ultrasonic sensor and the sensor may comprise an infrared receiver paired with an infrared emitter and an infrared receiver control unit. In the user interface system, the user interface control module may be adapted to, responsive to receiving the indication of the selection of the particular image, transmit an instruction to a body control module. The instruction may relate to unlocking vehicle doors. The instruction may relate to locking vehicle doors. The instruction may relate to opening vehicle windows. The instruction may relate to closing vehicle windows. The instruction may relate to opening a vehicle power liftgate. The instruction may relate to closing a vehicle power liftgate. The instruction may relate to opening a vehicle power sliding door. The instruction may relate to closing a vehicle power sliding door.

The method of controlling elements of a vehicle may further comprise receiving, at the user interface control module, the indication of the selection of the particular image and responsive to the receiving, transmitting an instruction to a body control module.

In the display, access and information system, the sensor may be adapted to sense depression of a brake pedal and the particular image may be a red rectangle.

In the display, access and information system, the sensor may be adapted to sense a change in state of a turn signal arm and the particular image may be an arrow.

In the display, access and information system, the sensor may be adapted to sense a change in state of a dashboard button and the particular image may be an arrow.

In the display, access and information system, the sensor may be adapted to sense a change in state of a gear shifter and the particular image may be a pair of arrows.

In the display, access and information system, the sensor may be adapted to sense a change in state of an aspect of the interior environment of the vehicle, the change in state indicative of presence of a vehicle occupant.

In the display, access and information system, the sensor may comprise a thermometer.

The above-described implementations of the present application are intended to be examples only. Alterations, modifications and variations may be effected to the particular implementations by those skilled in the art without departing from the scope of the application, which is defined by the claims appended hereto.

What is claimed is:

1. A user interface system comprising:
    a user interface including:
        an image display mechanism that, responsive to instructions, causes a plurality of images to appear on an otherwise transparent portion of a closure for an opening in a body of a vehicle; and
        a sensor control unit that, in operation:
            detects selection, by a user, of a particular image among the plurality of images; and
            transmits, to a user interface control hardware module, an indication of the selection of the particular image;
    the user interface control hardware module in communication with the user interface and a vehicle body control module, the vehicle body control module in communication with a plurality of control modules wherein, in operation, the user interface control hardware module:
    controls the image display mechanism;
    receives, from the sensor control unit, the indication of the selection of the particular image, the particular image corresponding to a particular control module among the plurality of images; and
    responsive to receipt of the selection of the particular image, transmits an instruction to the vehicle body control module to, thereby, cause an instruction to be transmitted, by the vehicle body control module, to the particular control module.

2. The user interface system of claim 1 wherein the image display mechanism is further adapted to:
    cause display of advertising;
    cause display of a request for roadside assistance;
    cause display of vehicle alarm warnings;
    cause display of a map; or
    cause display of a replica of that which is being displayed on a mobile communication device.

3. The user interface system of claim 1 wherein the sensor control unit connects to:
    a capacitive switch wire having a switch wire portion mounted to the portion of the closure, the switch wire portion ending at a terminus; and
    a capacitive switch control unit connected to the capacitive switch wire and adapted to interpret a change a capacitance near the terminus of the capacitive switch wire as the selection of the particular image, where the particular image is displayed proximate the terminus.

4. The user interface system of claim 1 wherein the sensor control unit connects to an eye tracking camera.

5. The user interface system of claim 1 wherein the sensor control unit connects to an ultrasonic sensor.

6. The user interface system of claim 1 wherein the sensor control unit connects to an infrared receiver paired with an infrared emitter and an infrared receiver control unit.

7. The user interface system of claim 1 wherein the instruction relates to: unlocking vehicle doors; locking vehicle doors; opening vehicle windows; closing vehicle windows; opening a vehicle power liftgate; closing a vehicle power liftgate; opening a vehicle power sliding door; or closing a vehicle power sliding door.

8. A method of controlling elements of a vehicle, the method comprising:
    controlling, at a user interface control hardware module, an image display mechanism to cause a plurality of images to appear on an otherwise transparent a portion of a closure for an opening in a body of a vehicle;
    detecting, at a sensor associated with a sensor control unit, selection, by a user, of a particular image among the plurality of images;
    transmitting, from the sensor control unit to the user interface control hardware module, an indication of the selection of the particular image;
    receiving, at the user interface control hardware module, the indication of the selection of the particular image, the particular image corresponding to a particular control module among a plurality of control modules; and
    responsive to the receiving, transmitting an instruction to a vehicle body control module to, thereby, cause an instruction to be transmitted, by the vehicle body control module, to the particular control module.

9. The user interface system of claim 3 wherein the transparent portion of a closure is a rear window comprising rear window defrosting wires, a portion of the capacitive switch wire being in an overlapping relationship with the rear window defrosting wires.

10. The user interface system of claim 1 wherein the sensor control unit connects to a Radar sensor.

11. The user interface system of claim 1 wherein the sensor control unit connects to a sensor adapted to detect selection of a particular image among the plurality of images based on a user pressing onto the exterior portion of the otherwise transparent portion of a closure onto which the image has been projected.

12. The user interface system of claim 1 wherein the sensor control unit connects to a sensor adapted to detect selection of a particular image among the plurality of images based on a user swiping the otherwise transparent portion of a closure onto which the image has been projected.

13. The user interface system of claim 1 wherein the user interface is activated when a Passive Keyless Entry fob is sensed in proximity to the vehicle.

14. The user interface system of claim 1 wherein the image display mechanism is adapted to cause the plurality of images to appear by selectively changing the light transmission properties of regions of the otherwise transparent portion of a closure.

15. The method of claim 8 further comprising:
unlocking vehicle doors by the vehicle body control module in response to the received instruction;
locking vehicle doors by the vehicle body control module in response to the received instruction;
opening vehicle windows by the vehicle body control module in response to the received instruction;
closing vehicle windows by the vehicle body control module in response to the received instruction;
opening a vehicle power liftgate by the vehicle body control module in response to the received instruction;
closing a vehicle power liftgate by the vehicle body control module based in response to the received instruction;
opening a vehicle power sliding door by the vehicle body control module in response to the received instruction; or
closing a vehicle power sliding door by the vehicle body control module in response to the received instruction.

16. The method of claim 8 further comprising altering a visual aspect of one or more of the plurality of images subsequent to transmitting the instruction to the vehicle body control module.

17. The user interface system of claim 1 wherein the image display mechanism is adapted to alter a visual aspect of one or more of the plurality of images subsequent to transmitting the instruction to the vehicle body control module.

18. The user interface system of claim 1 wherein the plurality of images comprises a plurality of unique targets, wherein each target of the plurality of unique targets is representative of a particular operation.

19. The method of claim 8 wherein the plurality of images comprises a plurality of unique targets, wherein each target of the plurality of unique targets is representative of a particular operation.

20. The user interface system of claim 1 wherein the portion of the closure includes a light-catching transparent film adhered thereto.

21. The user interface system of claim 20 wherein the image display mechanism comprises a projector to project the plurality of images on the light-catching transparent film.

22. The user interface system of claim 1 wherein the user interface control hardware module is in communication with an authentication system and, in operation, the user interface control hardware module:
receives an indication, from the authentication system, that proximity of a fob has been sensed; and
responsive to receiving the indication, activates the image display mechanism to cause the plurality of images to appear.

23. The user interface system of claim 22 wherein the authentication system includes an antenna.

24. The user interface system of claim 22 wherein the authentication system and the fob are components of a passive keyless entry system.

25. The user interface system of claim 22 wherein, in operation, the user interface control hardware module receives an indication, from the authentication system, that the fob has been authenticated.

26. The user interface system of claim 13 wherein, in operation, the user interface control hardware module:
receives an indication, from an authentication system, that the Passive Keyless Entry fob has been authenticated; and
responsive to receiving the indication, activates the image display mechanism to cause the plurality of images to appear.

* * * * *